US012700213B2

(12) United States Patent
Van Der Vleuten

(10) Patent No.: US 12,700,213 B2
(45) Date of Patent: Aug. 4, 2026

(54) CONTENT-OPTIMIZED AMBIENT LIGHT HDR VIDEO ADAPTATION

(71) Applicant: KONINKLIJKE PHILIPS N.V., Eindhoven (NL)

(72) Inventor: Renatus Josephus Van Der Vleuten, Veldhoven (NL)

(73) Assignee: Koninklijke Philips N.V., Eindhoven (NL)

(*) Notice: Subject to any disclaimer, the term of this patent is extended or adjusted under 35 U.S.C. 154(b) by 291 days.

(21) Appl. No.: 18/289,383

(22) PCT Filed: Apr. 21, 2022

(86) PCT No.: PCT/EP2022/060575
§ 371 (c)(1),
(2) Date: Nov. 3, 2023

(87) PCT Pub. No.: WO2022/233587
PCT Pub. Date: Nov. 10, 2022

(65) Prior Publication Data

US 2024/0242472 A1 Jul. 18, 2024

(30) Foreign Application Priority Data

May 7, 2021 (EP) .................................... 21172653

(51) Int. Cl.
*G06V 10/60* (2022.01)
*G06V 10/56* (2022.01)
(Continued)

(52) U.S. Cl.
CPC .............. *G06V 10/60* (2022.01); *G06V 10/56* (2022.01); *G09G 5/10* (2013.01); *H04N 5/165* (2013.01); *G09G 2320/0626* (2013.01)

(58) Field of Classification Search
CPC .................. G06V 10/60; G06V 10/56; G09G 2320/0626; H04N 1/6088; H04N 1/603;
(Continued)

(56) References Cited

U.S. PATENT DOCUMENTS 10,148,907 B1 * 12/2018 Wu .......................... G06T 5/92
10,366,672 B2 * 7/2019 Van Mourik .......... H04N 19/85
(Continued)

FOREIGN PATENT DOCUMENTS

WO 2020146655 A1 7/2020

OTHER PUBLICATIONS

Recomendation of ITU-R BT 814.4 "Specifications of Pluge Test Signals and Alignment Procedures for Setting of Brightness and Contrast of Displays" Geneva 2018.
(Continued)

*Primary Examiner* — Sumati Lefkowitz
*Assistant Examiner* — Connor L Hansen

(57) ABSTRACT

The luminances of an image are not only optimized for a particular maximum displayable luminance of a display, but also for a particular amount of light in the viewing environment in which the display is watched. A method of processing an input image to obtain an output image includes receiving a reference luminance mapping function as metadata associated with an input image, calculating an adapted luminance mapping function on the reference luminance mapping function; calculating a control parameter that specifies how much the adapted luminance mapping function deviates from the reference luminance function and is based on a maximum luminance of a display and a black level of the display; and applying the adapted luminance mapping function to at least a portion of the input pixel luminances so as to obtain output luminances for at least a portion of pixels of the output image.

7 Claims, 8 Drawing Sheets

(51) Int. Cl.
*G09G 5/10* (2006.01)
*H04N 5/16* (2006.01)

(58) Field of Classification Search
CPC .. H04N 1/6027; H04N 5/165; H04N 21/4854; G06T 7/90; G06T 2207/20208
See application file for complete search history.

(56) References Cited

U.S. PATENT DOCUMENTS

| | | | | |
|---|---|---|---|---|
| 2017/0116963 | A1* | 4/2017 | Wanat | G09G 3/3406 |
| 2019/0164262 | A1* | 5/2019 | Cellier | G06T 5/92 |
| 2019/0304379 | A1 | 10/2019 | Pytlarz et al. | |
| 2021/0096023 | A1 | 4/2021 | Yang et al. | |
| 2022/0164929 | A1* | 5/2022 | Liu | G06T 5/92 |

OTHER PUBLICATIONS

International Search Report and Written Opinion from PCT/EP2022/060575 mailed Jul. 27, 2022.

Working Party 6C "High Dynamic Range Television for Production and International Programme Exchange" Mar. 27, 2017.

* cited by examiner

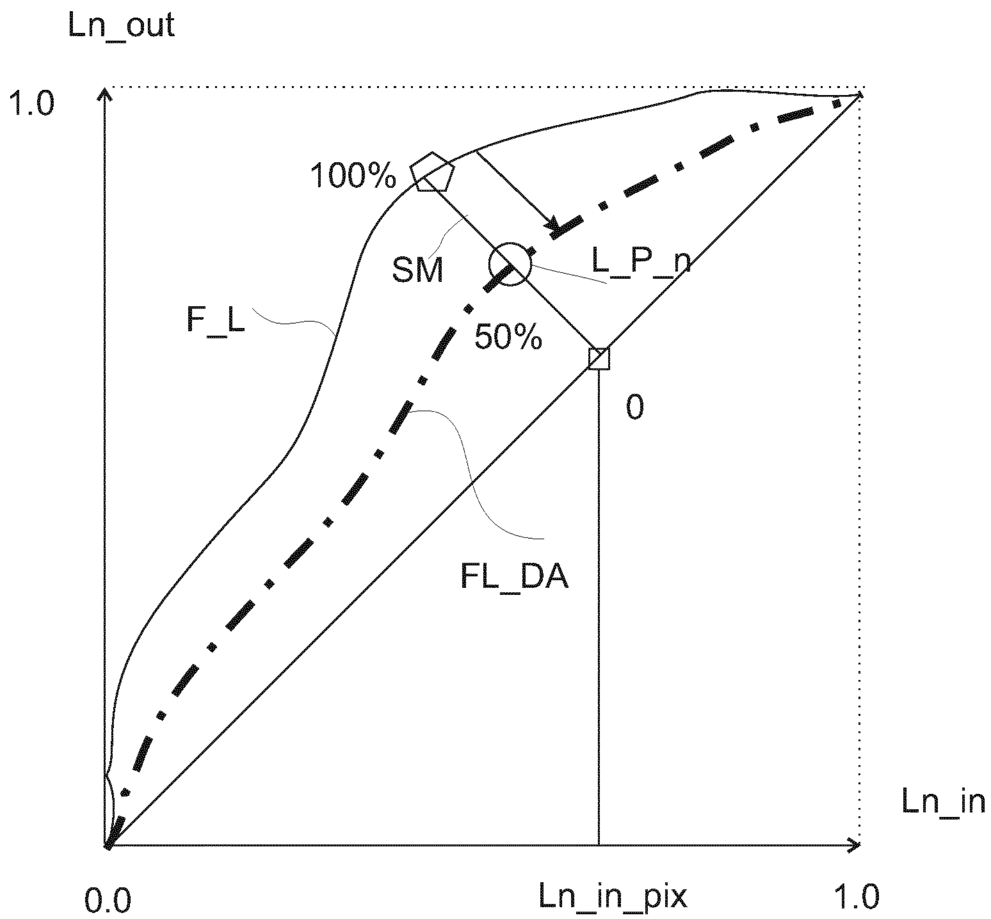
Fig. 4a
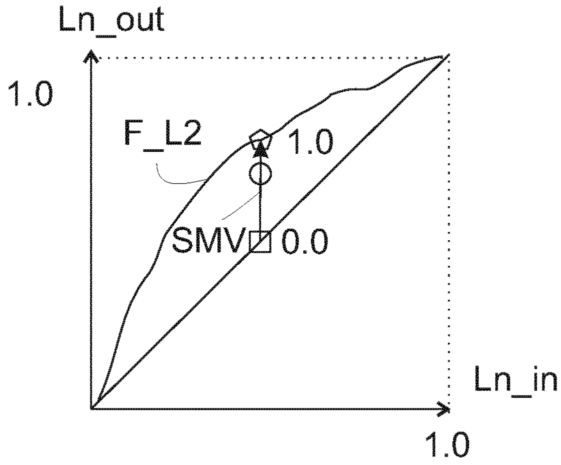
Fig. 4b
Fig. 4

CONTENT-OPTIMIZED AMBIENT LIGHT HDR VIDEO ADAPTATION

CROSS-REFERENCE TO PRIOR APPLICATIONS

This application is the U.S. National Phase application under 35 U.S.C. § 371 of International Application No. PCT/EP2022/060575, filed on Apr. 21, 2022, which claims the benefit of EP Patent Application No. EP 21172653.4, filed on May 7, 2021. These applications are hereby incorporated by reference herein.

FIELD OF THE INVENTION

The invention relates to methods and apparatuses for adapting the image pixel luminances of a High Dynamic Range video to yield a desired look for a situation of displaying the HDR video under a particular viewing site ambient light amount.

BACKGROUND OF THE INVENTION

A few years ago, novel techniques of high dynamic range (HDR) video coding were introduced, inter alia by applicant (see e.g. WO2017157977).

Coding of a video is generally concerned mostly, or only, with making or more precisely defining color codes (e.g. a luma and two chromas per pixel) to represent the images. This is something different than knowing how to optimally display a HDR image (e.g., the simplest methods merely employ a highly non-linear Opto-Electrical transfer function OETF to convert desired luminances into e.g. 10 bit luma codes, and vice versa one can convert those video pixel luma codes into to be displayed luminances, by using an inversely shaped Electro-optical transfer function EOTF, mapping the 10 bit electrical luma codes to the to be displayed optical pixel luminances, but more complex systems can deviate in several directions, in particular by disconnecting the coding of an image, from a particular use of a coded image).

The coding and handling of HDR video contrasts quite majorly with how legacy video technology was used, according to which all videos were encoded until recently, which is nowadays called Standard Dynamic Range (SDR) video coding (a.k.a. low dynamic range video coding; LDR). This SDR started out as PAL or NTSC in the analogue era, moving to Rec. 709-based coding e.g. MPEG2 compressed in the digital video era.

Though being a satisfactory technology for communicating moving pictures in the $20^{th}$ century, advances in display technology, beyond the physical limits of the electron beam of the $20^{th}$ century CRT, or the globally TL-backlit LCD, made it possible to show images with significantly brighter (and potentially also darker) pixels than on those legacy displays, which urged a need to be able to code, and create such HDR images.

In fact, starting with the much brighter and possibly also darker image objects being uncodeable with the SDR standard (8 bit Rec. 709), for various reasons, one first invented ways of being able to technically represent those increased luminance range colors, and therefrom one by one all the rules of video technology were revisited, and often had to be re-invented.

SDR's luma code definition, of Rec. 709, was able to encode (with 8, or 10 bit lumas) only about 1000:1 luminance dynamic range because of its approximately square root OETF function shape, luma. Y_code=power(2, N)*sgrt (L_norm), in which N is the number of bits of the luma channel, and L_norm is a normalized between 0 and 1 version of the physical luminances.

Furthermore, in the SDR era there was no absolute to be displayed luminance defined, so one in fact mapped the maximum relative luminance L_norm_max=100%, or 1, to the maximum normalized luma code, Yn=1, corresponding to e.g. Y_code max=255, via the square root OETF. This has several technical differences compared to making absolute HDR images, i.e. in which an image pixel coded to be displayed as 200 nit, is ideally (i.e. when possible) to be displayed as 200 nit, on all displays, and not as a quite different displayed luminance. In the relative paradigm, the 200 nit coded pixel luminance may be displayed at 300 nit on a brighter display, i.e. a display with a brighter maximum displayable luminance PL_D (a.k.a. display maximum luminance), and e.g. 100 nit on a lesser capability display. Note that also absolute encodings can work on normalized luminance representations, or normalized 3D color gamuts, but then 1.0 means e.g. uniquely 1000 nit.

At the display such a relative image got displayed somewhat heuristically, normally by mapping the brightest luminance of the video to the brightest displayable pixel luminance (which happened automatically without involving further luminance mapping, via the electrical driving the display panel by the max. luma Y_code max), so if you bought a 200 nit PL_D display your white looked 2× brighter than on a 100 nit PL_D display, but given such factors like eye adaptation that was considered not to matter too much, except for giving a brighter, better watchable and somewhat more beautiful version of the same SDR video images.

Conventionally if one nowadays (in the absolute framework) speaks about a SDR video IMAGE, it typically has a video peak luminance of PL_V=100 nit (e.g. agreed per standard), so in this application we consider the maximum luminance of an SDR image (or SDR grading) to be exactly that, or generalized around that value.

Grading in this application is intended to mean either the activity or the resultant image in which pixels have been given a luminance as desired, e.g. by a human color grader, or an automaton. If one looks at an image, e.g. designs an image, there will be several image objects, and one may ideally want to give the pixels of those objects a luminance spread around an average luminance which is optimal for that object, given also the totality of the image, and the scene. E.g., if one has an image capability available so that the brightest codeable pixel of that image is 1000 nit (the image or video maximum luminance PL_V), one grader may elect to give the pixels of an explosion luminance values between 800 and 1000 nits, to make the explosion appear quite punchy, whereas another movie maker may elect an explosion no brighter than 500 nit, to e.g. not deter too much from the rest of the image at that moment in time (and of course technology should be able to handle both situations).

The maximum luminance of a HDR image or video may vary considerably, and is typically co-communicated with the image data as a metadatum about the HDR video or image (typical values may be e.g. 1000 nit, or 4000 nit, or 10,000 nit, non-limited; typically one would say to have a HDR image when PLV is at least 600 nit). If the video creator elects to define his images as PL_V=4000 nit, he can of course elect to create brighter explosions, although relatively they would not reach to the 100% level of PL_V, but e.g. only up to 50% for such a high PL_V definition of the scene.

HDR displays may have a maximum capability, i.e. a highest displayable pixel luminance of (starting for the lower end HDR displays) e.g. 600 nit, or 1000 nit, or a number N times 1000 nits. That display maximum—or peak-luminance PL_D is something else than the video maximum luminance PL_V, and those two should not be confused. A video creator cannot typically make an optimal video for each possible end-user display (i.e. in which the capability of the end-user display is used optimally by the video, with the maximum luminance of the video never exceeding the maximum luminance of the display (ideally), but also not being lower, i.e. there should at least be some pixels in some of the video images which have a pixel luminance L_p=PL_V=PL_D).

The creator will make some of his own decisions (e.g. what kind of content is he capturing, and in which manner), and typically make a video with a PLV so high that he can at least serve the highest PL_D displays of his intended audience today, and possibly also in the future, when higher PL_D displays may have emerged.

A secondary question then emerges, how to best display an image with a peak luminance PL_V on a display with a (oftentimes much) lower display peak luminance PL_D, which is called display adaptation. Even in the future, there will still be displays that require a lower dynamic range image than the e.g. 2000 nit PL_V image which was created, and is received via a communication medium. In theory a display can always re-grade i.e. map the luminances of the image pixels so that they become displayable by its own internal heuristics, but if the video creator takes good care in determining the pixel luminances, it may be beneficial that he can also indicate how his image should be display adapted to lower PL_D values, and ideally the display follows these technical desiderata to a large degree.

Regarding the darkest displayable pixel luminance BL_D, the situation is more complicated. Some of it may be a fixed physical property of the display, like e.g. LCD cell leak light, but, even with the best displays, what the viewer can ultimately discern as different darkest blacks, also depends on the illumination of the viewing room, which is not a well-defined value. This illumination can be characterized as e.g. an average illuminance level in lux, but for video displaying purposes more elegantly as a minimum pixel luminance. This typically also involves the human eye, in a more strong manner than the appearance of bright or middle luminances, because if the human eye is looking at a lot of pixels of high brightness, the darker pixels, and especially their absolute luminance, may become less relevant. But one can assume the eye not to be the limiting factor, e.g. when watching a largely dark scene image but still masked by surround light on the front of the display screen. If one assumes that a human can see 2% just noticeable difference, there is some darkest driving level (or luma) b, above which one can still see the next dark luma level (i.e. X % higher in displayed luminance, e.g. displaying 2% more luminance level).

In the LDR era one didn't care too much about the darkest pixels at all. One cared mostly about the average luminance, approximately % of the maximum PL_V=100 nit. If the image was exposed around this value, everything in the scene looked nicely bright and colorful, except for the clipping of bright parts of the scene above the 100% maximum. For the darkest parts of the scene, in case they were sufficiently important, one created the captured images with a sufficient amount of base lighting in the recording studio or shooting environment. If some of the scene was not seen well, e.g. because it got drowned into the code Y=0, that was considered normal.

Ergo, if nothing is specified further, one may assume that the blackest black is zero, or something like 0.1 or 0.01 nit in practice. In such a situation the technologist cares more about the above-average brighter pixels in the HDR image, as coded, and/or displayed.

Regarding the coding, the difference between HDR and SDR is not only a physical one (more different pixel luminances, to be displayed on larger dynamic range capability displays), but also a technical one involving a different luma code allocation function (for which one uses the OETF; or in absolute methods the inverse of the EOTF), and potentially also further technical HDR concepts like e.g. additional dynamically (per image or set of temporally successive images) changing metadata, which specifies how to re-grade the various image object pixel luminances to obtain an image of a secondary dynamic range different from a starting image dynamic range (the two luminance ranges typically ending at a peak luminance which differs at least 1.5×), etc.

A simple HDR codec was introduced to the market, the HDR10 codec, which is e.g. used to create the recently appearing blackjewelbox HDR blu-rays. This HDR10 video codec uses as OETF (inverse EOTF) a more logarithmically shaped function than the square root, namely the so-called Perceptual Quantizer (PQ) function which is standardized in SMPTE 2084. Instead of being limited to 1000:1 like the Rec. 709 OETF, this PQ OETF allows defining lumas for many more (ideally to be displayed) luminances, namely between 1/10,000 nit and 10,000 nit, sufficient for practical HDR video production.

Note that the reader should not simplistically confuse HDR with a large amount of bits in the luma code words. That may be true for linear systems like the amount of bits of an analog-digital convertor, wherein indeed the amount of bits follows as the logarithm with base 2 of the dynamic range. However, since code allocation functions can have a quite non-linear shape, in theory however one desires, one can define HDR images with only 10 bit lumas (and even 8 bit per color component HDR images), which led to the advantage of reusability of already deployed systems (e.g. ICs may have a certain bit-depth, or video cables, etc.).

After the calculation of the lumas, one has a 10 bit plane of pixel lumas Y_code, to which two chrominance components Cb and Cr per pixel are added, as chrominance pixel planes. This image can be classically treated further down the line "as if" it was an SDR image mathematically, e.g. MPEG-HEVC compressed, etc. The compressor doesn't really need to care about the pixel colors or luminances. But the receiving apparatus e.g. display (or in fact its decoder) typically needs to do the correct color interpretation of the {Y,Cb,Cr} pixel colors, to display a correctly looking image, and not an image which has e.g. bleached colors.

This is usually handled by co-communicating further image definition metadata together with the three pixelized color component planes, which defines the image coding, such as an indication which EOTF is used, for which we shall assume without limitation that the PQ EOTF (or OETF) was used, and a value of PL_V, etc.

More sophisticated codecs may include further image definition metadata, e.g. handling metadata, e.g. a function specifying how to map normalized version of luminances of a first image up to PL_V=1000 nit, to normalized luminances of a secondary reference image, e.g. a PL_V=100 nit SDR reference image (as we elucidate in more detail with FIG. 2).

To be clear, reference image is not a single prefixed image. For each image of a scene (e.g. any successive image in a video) one can make one or more reference images, which are defined on a particular dynamic range (i.e. for said DR, in particular its highest luminance PL_V, the various intermediate object luminances will have values which will depend on the range, ergo, reference images represent how an image should be graded for various DR, and at least two reference images indicate how one of those two images should be luminance re-graded for the DR of the other image). Equality of images implies typically equality of their pixel colors. Various images of different dynamic range can correspond to each other in such that the pixel luminances of a first image shift to different luminances for the corresponding image of different DR.

For the convenience of getting readers which are less knowledgeable about HDR up to speed, we quickly elucidate some interesting aspects in FIG. 1, which shows a couple of archetypical illustrative examples of the many possible HDR scenes a HDR system of the future (e.g. connected to a 1000 nit PL_D display) may need to be able to correctly handle. Actual technical processing of the pixel colors can happen in various color space definitions in various manners, but the desideratum of a re-grading can be shown as an absolute luminance mapping, between luminance axes spanning different dynamic ranges.

E.g. ImSCN1 is a sunny outdoors image from a western movie, which has mostly bright areas. A first thing one should not misunderstand is that the pixel luminances in any image are typically not the luminances one can actually measure in the real world.

Even if there was no further human involvement in the creation of the output HDR image (which can function as a starter image, which we shall call the master HDR grading or image), no matter how simple by tweaking one parameter, the camera because of its iris at least always measures relative luminances in the image sensor. So there is always some step involved into where at least a brightest image pixel ends up in the available coding luminance range of the master HDR image.

E.g., one may measure a specular reflection of the sun on the sheriff's star badge to be above 100,000 nit in the real world, but that is neither possible to display on the typical near-future display, nor pleasant for a viewer watching the image in a movie, e.g. in a dimly lit room in the evening. Instead, the video creator may decide that 5000 nit is bright enough for the pixels of the badge, so if this is to be the brightest pixel in the movie, the video creator may decide to make a PL_V=5000 nit video. Although, being a relative pixel luminance measuring device only for a RAW version of the master HDR grading, a camera should also have a sufficiently high native dynamic range (full pixel well over noise floor) to make good images. The pixels of the graded 5000 nit image are typically derived in a non-linear manner from the camera captured RAW image, wherein e.g. the color grader will take into account such aspects as typical viewing situation, which will not be the same as when standing in the actual shooting location, i.e. the hot desert. The best (highest PL_V) image one elects to make for this scene ImSCN1, i.e. in this example the 5000 nit image is the master HDR grading. This is the minimally required HDR data to be created and communicated, but not in all codecs the only data communicated, nor in some codecs even the image that gets communicated at all.

Having available such an encodeable high luminance range DR_1, e.g. between 0.001 nit and 5000 nit, would allow the content maker to offer to the viewer a better experience of bright exteriors, but also dimmer night scenes (when well graded throughout the movie), of course, provided that the viewer will also have a corresponding high end PL_D=5000 nit display. A good HDR movie balances the luminance of various image objects not only in one image, but also over time in the story of the movie, or in general created video material (e.g. a well-designed HDR soccer program).

On the leftmost vertical axis of FIG. 1 are shown some (average) object luminances as one would like to see them in the 5000 nit PL_V master HDR grading, intended ideally for a 5000 nit PL_D display. E.g., in a movie, one may want to show a bright sunlit cowboy having pixel luminances around 500 nit (i.e. 10× brighter than in LDR typically, although another creator may desire somewhat less HDR punch, e.g. 300 nit), which would constitute according to the creator the best manner to display this western image, giving the best possible look to the end consumer.

The need for a higher dynamic range of luminances is more easily understood by thinking about and image which in the same image has quite dark regions, such as the shadowy corners of the cave image ImSCN3, but also relatively large areas of very bright pixels, like the sunlit outside world seen through an entrance of the cave. That creates a different visual experience than e.g. the nighttime image of ImSCN2, in which only the street lights contain high luminance pixel regions.

Now a problem is that one needs to be able to define a PL_V_SDR=100 nit SDR image optimally corresponding to the master HDR image, because at the moment still many consumers have an LDR display, and even in the future there will be good reasons to make two gradings of a movie, instead of the archetypical sole HDR image per se coding. This is a technical desideratum which stands separate from the technical elections regarding the coding per se, which is e.g. evidenced that if one knows how to (invertibly) create one of the master HDR image and this secondary image from the other one, one can elect to code and communicate either one of the pair (effectively communicating two images for the price of one, i.e. communicating only one image a pixel color component planes per video time instant).

In such a reduced dynamic range image, one can of course not define 5000 nit pixel luminance objects like a really bright sun. The minimum pixel luminance or deepest black may also be as high as 0.1 nit, rather than a more preferable 0.001 nit.

So somehow one should be able to make this corresponding SDR image with a reduced luminance dynamic range DR_2.

This could be done by some automatic algorithm in the receiving-side display, e.g. one could use a fixed luminance mapping function, or maybe one conditioned by the simple metadata like the PL_V_HDR value, and potentially one or more other luminance values.

However, in general more complex luminance mapping algorithms can be used, but for this application we assume without loss of generality that the mapping is defined by some global luminance mapping function F_L (e.g. one function per image), which defines for at least one image how all possibly occuring luminances in the first image (i.e. e.g. 0.0001-5000) are to be mapped to corresponding luminances of the second, output image (e.g. 0.1 to 100 nit for an SDR output image). The normalized function can be obtained by dividing the luminances along both axis by their respective maximum. Global in this context means that the same function is used for all pixels of the image irrespective of further conditions like e.g. their position in the image (more generic algorithms using e.g. several functions for pixels classifiable according to some criterium).

Ideally, how all luminances should re-distribute along the available range of the secondary image, the SDR image, should be determined by the video creator, since he knows best how to sub-optimize for a reduced dynamic range so that, given limitations, the SDR image still looks at least as good as feasible like the intended master HDR image. The reader can understand that actually defining (positioning) such object luminances corresponds to defining a shape of the luminance mapping function F_L, the details of which are beyond this present application.

Ideally the shape of the function should also change per different scene, i.e. the cave scene versus the sunny western scene a little later in the movie, or in general per temporal image. This is called dynamic metadata (F_L(t), with t indicating image time instant).

Now ideally the content creator would make an optimal image for each situation, i.e. each potentially served end-user display, e.g. a display with PL_D_MDR=800 nit requiring a corresponding PL_V_MDR=800 nit image, but that is typically much too much effort for the content creator, even in the most expensive offline video creations.

It has however been demonstrated previously by applicant that it suffices to make (only) two different dynamic range reference gradings of the scene (typically on extreme ends, e.g. 5000 nit being the highest necessary PL_V, and 100 nit typically sufficing as the lowest needed PL_V), since one can then derive all the other gradings from those two reference gradings (HDR and SDR) automatically, via some (typically fixed, e.g. standardized) display adaptation algorithm, e.g. applied in the end-user display which receives information of the two gradings. In general the calculations can be done in any video receiver, e.g. a settopbox, TV, computer, cinema equipment or the like. The communication channel for the HDR images can also be any communication technology, e.g. terrestrial or cable broadcasting, physical media like a blu-ray disk, the internet, communication channels to portable devices, professional inter-site video communication, etc.

This display adaptation may typically also apply a luminance mapping function, e.g. to the pixel luminances of the master HDR image. But the display adaptation algorithm needs to determine a different luminance mapping function than the F_L_5000 to 100 (which is the reference luminanance mapping function connecting the luminances of the two reference gradings), namely display adapted luminance mapping function FL_DA, which is not necessarily trivially related to the original mapping function between the two reference gradings, F_L (there can be several variants of display adaptation algorithms). A luminance mapping function between master luminances defined on a 5000 nit PL_V dynamic range, and a 800 nit medium dynamic range will in this text be written as F_L_5000to800.

We have shown the display adaptation symbolically (for one of the average object pixel luminances only) by an arrow which doesn't map to where one would "naively" expect the F_L_5000to100 function to cross the 800 nit MDR image luminance range, but e.g. somewhat higher (i.e. in such an image the cowboy must be slightly brighter, at least according to the elected display adaptation algorithm). So some more complex display adaptation algorithms may place the cowboy at the indicated higher position, but some customers may be satisfied with the simpler position where the connection between the 500 nit HDR cowboy and the 18 nit SDR cowboy crosses the 800 nit PL_V luminance range.

Typically the display adaptation algorithm calculates the shape of the display adapted luminance mapping function FL_DA based on the shape of the original luminance mapping function F_L (or reference luminance mapping function a.k.a. reference re-grading function).

This FIG. 1-based elucidating constituting the technical desiderata of any HDR video coding and/or handling system, in FIG. 2 we illustrate some exemplary technical systems and their components to realize the desiderata (non-limiting), as according to a codec approach of the present applicant. It should be understood by the skilled reader that these components can be embodied in various devices etc. The skilled person should understand that this example merely is presented as a pars pro toto for various HDR codec frameworks, to have a background understanding of some principles of operation, and it is not intended to particularly limit any of the embodiments of the innovative contribution presented below.

Although possible, technical communication of two actual different images per time instant (the HDR and SDR grading being each communicated as their respective three color planes) is expensive inter alia regarding the amount of data needed.

It is also not necessary, since if one knows that all corresponding secondary image pixel luminances can be calculated based on the luminance in the primary image and the function F_L, one can decide to communicate only the primary image and the function F_L per time instant as metadata (and one can elect to communicate either the master HDR or the SDR image as representative for the both). As the receiver knows its—typically fixed-display adaptation algorithm, it can based on this data determine the FL_DA function at its end (there may be further metadata communicated controlling or guiding the display adaptation, but that is not currently deployed).

There can be two modes of communicating a sole image per time instant and the function F_L.

In the first, backwards-compatible mode, one communicates the SDR image ("SDR communication mode"). That SDR image can be directly (without needing further luminance mapping) displayed on legacy SDR displays, but HDR displays need to apply the F_L or FL_DA function to obtain a HDR image from the SDR image (or its inverse, depending on which variant of the function is communicated, the up-grading or the down-grading variant). The interested reader can find all details of an exemplary first mode approach of the present applicant standardized in:

ETSI TS 103 433-1 V1.2.1 (2017 August): High-Performance Single Layer High Dynamic Range System for use in Consumer Electronics devices; Part 1: Directly Standard Dynamic Range (SDR) Compatible HDR System (SL-HDR1).

Another mode communicates the master HDR image itself ("HDR communication mode"), i.e. e.g. the 5000 nit image, and the function F_L which allows calculating the 100 nit SDR image from it (or any other lower dynamic range image, via the display adaptation). The master HDR communicated image itself can be encoded e.g. by using the PQ EOTF.

FIG. 2 also shows a total video communication system. At the transmission side, it begins with a source of images 201. Depending on whether one has offline created video, e.g. from an internet-delivery company, or real-life broadcast, this may be anything ranging from a hard disk to a cable output from e.g. a television studio, etc.

This yields the master HDR video (MAST_HDR) e.g. color graded by the human color grader, or a shaded version of a camera capturing, or by means of an automatic luminance re-distribution algorithm, etc.

In addition to grading a master HDR image, a set of often reversible color transformation functions F_ct is defined. Without intending to lose generalization, we assume this to comprise at least one luminance mapping function F_L (however, there may be further functions and data, e.g. specifying how the saturation of pixels should change from the HDR to the SDR grading).

This luminance mapping function defines as said above the mapping between the HDR and SDR reference grading (the latter in FIG. 2 being the SDR image Im_SDR to be communicated to receivers; data-compressed via e.g. an MPEG or other video compression algorithm or not).

One should not confuse any color mappings of color transformer 220 with anything that was applied to the raw camera feed to obtain the master HDR video, which is here already assumed to be input, since this color transformation is for obtaining the image to be communicated, and simultaneously the re-grading desiderata, as technically formulated in the luminance mapping function F_L.

For an exemplary SDR-communicating type (i.e. SDR communication mode), the master HDR image is input to color transformer 202 which is configured to apply the F_L luminance mapping to the luminances of the master HDR image (MAST_HDR), to obtain all corresponding luminances written into output image Im_SDR. Let's assume for elucidation the shape of this function is tweaked per shot of images of a similar scene of a movie by a human color grader, by using color grading software. The applied functions F_ct (i.e. at least F_L) are written in (dynamic, handling) metadata to be co-communicated with the images, in the example MPEG Supplemental Enhancement Information data SEI(F_ct), or a similar metadata mechanism in other standardized or unstandardized communication methods.

Having correctly re-defined the to be communicated HDR images as corresponding SDR images, Im_SDR, those images are often (at least for e.g. broadcasting to end users) compressed using existing video compression techniques (e.g. MPEG HEVC or VVC, or AV1, and the like). This is performed in video compressor 203, which forms part of video encoder 221 (which in turn may be comprised in various forms of video creation apparatuses or systems).

The compressed image Im_COD is transmitted to at least one receiver over some image communication medium 205 (e.g. a satellite or cable or internet transmission, e.g. according to ATSC 3.0, or DVB, etc.; but the HDR video signal may also be communicated e.g. over a cable between two video handling apparatuses).

Typically before communication some further transformation may be done by transmission formatter 204, which may apply depending on the system such techniques as e.g. packetization, modulation, transmission protocol control, etc. This will typically apply integrated circuits.

At any receiving site, a corresponding video signal unformatter 206 applies the necessary unformatting methods to re-obtain the compressed video as a set of e.g. compressed HEVC images (i.e. HEVC image data), e.g. demodulation etc.

Video decompressor 207 does the e.g. HEVC decompression, to obtain a stream of pixelated uncompressed images Im_USDR, which in the present example are SDR images, but in the other mode would be HDR images. The video decompressor will also unpack the necessary luminance mapping function F_L from the e.g. SEI messages, or in general color transformation functions F_ct. The images and functions are input to a (decoder) color transformer 208 which is arranged to transform the SDR image to an image of any non-SDR dynamic range (i.e. of PL_V higher than 100 nit, and typically at least a few times higher, e.g. 5×).

E.g. a 5000 nit reconstructed HDR image Im_RHDR may be reconstructed as close approximation of the master HDR image (MAST_HDR) by applying the inverse color transformations IF_ct of the color transformations F_ct used at the encoding side to make the Im_LDR from the MAST_HDR. This image can then be sent e.g. to a display 210 for further display adaptation, but the making of a display adapted image Im_DA_MDR can also happen in one go, during the decoding, by using in the color transformer the FL_DA function (determined in an offline loop, e.g. in firmware) instead of the F_L function. So the color transformer may also comprise a display adaptation unit 209, to derive the FL_DA function.

The optimized e.g. 800 nit display adapted image Im_DA_MDR may be sent e.g. to a display 210 if the video decoder 220 is comprised e.g. in a settopbox or computer etc., or it may be sent to a display panel in case the decoder resides in e.g. a mobile phone, or it may be communicated to a movie theatre projector if the decoder resides in e.g. some internet-connected server, etc.

FIG. 3 shows a useful variant of internal processing of a color transformer 300 of a HDR decoder (or encoder, which may largely have the same topology typically, but using inverse functions, but typically not comprising the display adaptation), i.e. corresponding to FIG. 2, 208.

The luminance of a pixel, in this example an SDR image pixel, is inputted as a corresponding luma Y'SDR. The chrominance a.k.a. chroma components Cb and Cr are inputted into the lower processing path of color transformer 300.

The lumas Y'SDR are mapped to needed output luminances L'_HDR—e.g. master HDR reconstruction luminances, or some other HDR image luminances—by luminance mapping circuit 310. It applies the suitable function, e.g. the display adapted luminance mapping function FL_DA(t) for a particular image and maximum display luminance PL_D, as obtained from the display adaptation function calculator 350 which uses as input the metadata-co-communicated reference luminance mapping function F_L(t). The display adaptation function calculator 350 may also determine a suitable function for processing the chrominances. For the moment we will just assume that a set of multiplication factors mC[Y] for each possible input image pixel luma Y is stored in e.g. a color LUT 301.

When indexing the color LUT 301 with the luma value of the currently being color transformed (luminance mapped) pixel, Y, the needed multiplicative factor mC results as LUT output. This multiplicative factor mC is used by multiplier 302, to multiply it by the two chrominance values of the present pixel, i.e. to yield color transformed output chominances $$Cbo = mC * Cb,$$

$$Cro = mC * Cr$$

Via a fixed color matrixing processor 303, applying standard colorimetry calculations, the chrominances can be converted into brightness-lacking normalized non-linear R'G'B' coordinates R'/L', G'/L' and B'/L'.

The R'G'B' coordinates giving the appropriate luminance for the output image are obtained by multiplier 311, which calculates:

$$R'\_\text{HDR} = (R'/L') * L'\_\text{HDR},$$

$$G'\_\text{HDR} = (G'/L') * L'\_\text{HDR},$$

$$B'\_\text{HDR} = (B'/L') * L'\_\text{HDR},$$

which can be summarized in the color triplet R'G'B'_HDR.

Lastly, there may be a further mapping to a format needed for a display, by display mapping circuit 320. This yields display driving colors D_C, which not only may be formulated in a colorimetry desired by a display (e.g. even HLG OEFT format), but also this display mapping circuit 320 may in some variants be arranged to do some particular color processing for the display, i.e. it may e.g. further re-map some of the pixel luminances.

Some examples elucidating some suitable display adaptation algorithms to derive a corresponding FL_DA function for any possible F_L function that the creation side grader may have determined, are taught in WO2016/091406 or ETSI TS 103 433-2 V1.1.1 (2018 January).

Those algorithms however do not take much care about the minimum displayable black on the end-user's display.

In fact one could say they pretend that the minimum luminance BL_D is small enough that it can be said to be zero. Therefore the display adaptation takes care mostly of the differences in maximum luminance PL_D of the various displays, compared to the maximum luminance of the video PL_V.

As one can see in the $18^{th}$ drawing of prior application WO2016/091406, any input function (in the elucidation example a simple function formed from two linear segments) is scaled towards the diagonal based on a metric positioned along a 135 degree angle starting from a horizontal axis of input luminances in a plot of typically normalized to 1.0 input and output luminances. It should be understood that this is just an example of a display adaptation of a total class of display adaptation algorithms, which is not mentioned in a manner intending to limit the applicability of our novel display adaptation concepts, e.g. in particular the angle of the metric direction can have other values.

But this metric, and its action on the re-shaped F_L function, i.e. the determined FL_DA function, depends only on the maximum luminance PL_V, and PL_D for the display to be served with optimally re-graded medium dynamic range images. E.g., the 5000 nit position would correspond to the zero metric point located on the diagonal (for any location lying along the diagonal corresponding to a possible pixel luminance in the input image) and the 100 nit position (marked PBE) would be a point of the original F_L function.

The display adaptation, as a useful variant of the method, is summarized in FIG. 4, by showing its action on a plot of possible normalized input luminances Ln_in, versus normalized output luminances Ln_out (these will be converted to actual luminances by multiplication by the maximum luminance of the display associated with the normalized luminances, i.e. a PL_V value).

E.g. the video creator has designed a luminance mapping strategy between the two reference gradings as explained with FIG. 1. Ergo, for any possible normalized luminance of a pixel in the input image, Ln_in, say e.g. the master HDR image, this normalized input luminance must be mapped to a normalized output luminance Ln_out, of the second reference grading being the output image. This re-grading of all luminances corresponds to some function F_L, which can have many different shapes as determined by the human grader or grading automaton, and the shape of this function is co-communicated as dynamic metadata.

The question is now, what shape should a derived secondary version of the F_L function have, in this simple display adaptation protocol, to map to an MDR image (instead of to a reference SDR image) for a medium dynamic range display (assume a mapping again starting from as input image the HDR reference grading image). E.g., on a metric, one can calculate that a e.g. 800 nit display should have 50% of the grading effect, the full 100% being the re-grading of the master HDR image to the 100 nit PL_V SDR image. In general, one can via a metric determine any point between no re-grading and full re-grading to the second reference image, for any possible normalized input luminance of a pixel (Ln_in_pix), which is denoted as display-adapted luminance L_P_n, the location of which depends of course on the input normalized luminance, but also a value of the maximum luminance associated with the output image (PL_V_out).

We can determine the corresponding display adapted luminance mapping FL_DA as follows (see FIG. 4*a*). Take any one of all input luminances, e.g. Ln_inpix. This corresponds to a starting position on the diagonal having equal angles to the input and output axis of normalized luminances (shown as the square). Place a scaled version (scaled metric SM) of the metric at each point on the diagonal, so that it lies orthogonal to the diagonal (or 135 degrees from the input axis counter-clockwise), starts at the diagonal, and ends—with its 100% level—at a point on the F_L curve, i.e. at the intersection of the F_L curve with the orthogonal scaled metric SM (shown by the pentagon). Place a point at the (in the example, for this PL_D value of a display for which an image must be calculated) 50% level of the metric, i.e. halfway [note that in this case the PL_V value of the output image will be set equal to the PL_D value of the display which needs to be supplied with display-optimized images]. By doing this for all points on the diagonal, corresponding to all Ln_in values, one obtains the FL_DA curve, and it is similarly shaped as the original, i.e. does the same re-grading, but maximum-luminance-re-scaled/adjusted. This function is now ready to apply for calculating the needed corresponding optimally re-graded/display adapted 800 nit PL_V pixel luminances given any input HDR luminance value of Ln_in. This function FL_DA will be applied by luminance mapping circuit 310.

In general the properties of this display adaptation are as follows (and not intended as specifically more limited). The orientation of the metric may be pre-fixed as technically desired. FIG. 4*b* shows another scaled metric, namely a vertically oriented scaled metric SMV (i.e. orthogonal to the axis of the normalized input luminances Ln_in). Again, the 0% and 100% (or 1.0) correspond to no re-grading (i.e. an identity transformation to the input image luminances) respectively re-grading to the second one of the two reference grading images (in this example related by a differently shaped luminance mapping function F_L2).

The positions of the measurement points on the metric, i.e. where the 10%, 20% etc. value lies, may also be varied technically, but will typically be non-linear.

It will be pre-designed in the technology, e.g. a television display. E.g. a function as described in WO2015007505 may be used. One can also design a logarithmic function, so that some a*(log(PL_V)+b) equals 1.0 for the PL_V_HDR values (e.g. 5000 nit) and the 0.0 point corresponds to the 100 nit PL_V_SDR reference level, or vice versa. The position for any PL_V_MDR for which image luminances need to be calculated, then follows from the designed mathematics of the metric.

The action of such a metric is summarized with FIG. 5.

Display adaptation circuit 510, e.g. in a television, or settopbox, etc., may contain a configuration processor 511. It sets the values for processing of an image, before the running pixel colors of that image come in to be processed. E.g., the maximum luminance value of the display-optimized output image PL_V_out, may be set in the settopbox once by polling it from a connected display (i.e. the display communicates its maximum displayable luminance PL_D to the settopbox), or when the circuit resides in a television this may be configured by the manufacturer, etc.

The luminance mapping function F_L may in some embodiments vary per incoming image (in other variants it may be fixed for a multitude of images), and is input from some source of metadata information 512 (e.g. this may be broadcasted as SEI messages, read from a sector of a memory like a blu-ray disk, etc.). This data establishes the normalized heights of the normalized metrics (Sm1, Sm2, etc), on which desired positions for the PL_D value can be found from the mathematical equation of the metric.

When an image 513 is input, successive pixel luminances (e.g. Ln_in_pix_33 and Ln_in_pix_34 run through the color processing pipeline which applies the display adaptation, and corresponding output luminances result, such as Ln_outpix_33.

Note that there is nothing in this approach which specifically caters for a minimum black luminance.

This is because the normal approach would be as follows. The black level is very dependent on the actual viewing situation, which can be even more variable than the display characteristics (i.e. firstmost PL_D). All kinds of effect can happen, ranging from physical illumination aspects to the optimal configuration of the light sensitive molecules in the human eye.

So one makes a good image "for the display", and that's all (i.e. for how much more capable an intended HDR display is—brightness-wise—than a typical SDR display). Then where needed one can post-correct somewhat later on for the viewing situation, which would be an (undefined) ad hoc task left to the display.

Ergo, one typically assumes that the display can display all necessary pixel luminances as coded in the image (which for the moment we assume is already an MDR image optimized for the PL_D value, i.e. has at least some pixel regions in the image going up to PL_D typically) up to its variable high luminance capability, i.e. PL_D. That is because one in general doesn't want to suffer the harsh results of white clipping, but as said the blacks of the image are often not that interesting.

The blacks may be visible "mostly" anyhow, so if some of it is somewhat less well visible, that is not of paramount importance. At least one can optimally squeeze potentially quite bright pixel luminances of the master HDR grading into the limited upper range of the display, e.g. above 200 nit, say from 200 to PL_D=600 nit (for master HDR luminances up to e.g. 5000 nit).

This is akin to assuming the black is always zero nit, for all images, and all displays (at least approximately). Clipping of white colors can be a much more visually annoying property than losing some of the blacks, in which oftentimes still something can be seen, be it less comfortably.

However, sometimes that approach is not sufficient, as under significant surround light in the viewing room (e.g. a living room of a consumer television viewer with large windows during daytime), quite a significant sub-range of the darkest luminances may become invisible, or at least insufficiently visible. This would be different from the surround light situation in the video editing room in which the video is created, which may be dim, or even dark.

Therefore, one may need to raise the luminance of those pixels, e.g. with a control button on the display typically (a so-called brightness button).

If we take a television electronic behavior model as in Rec. ITU-R BT.814-4 (July 2018), the television in a HDR scenario gets luma+chroma pixel colors (in fact driving the display), and converts these (according to standard colorimetrical calculations) to non-linear R',G',B' non-linear driving values for driving its panel. The display will then process these R',G',B' non-linear driving values with the PQ EOTF to know which front screen pixel luminances to display (i.e. how to drive the e.g. OLED panel pixels, or the LCD pixels, where there typically is still an internal processing accounting for the electro-optical physical behavior of the LCD material, but that aspect is irrelevant for the present discussion).

The control knob, e.g. on the front of the display, can then give a luma offset value b (for the moment when the 2% above minimum black patch in a PLUGE or other test pattern becomes visible whilst the −2% black is not).

The original, uncorrected display behavior is e.g.:

$$\begin{aligned} LR\_D &= EOTF[\max(0, R')] = PQ[\max(0, R')] \\ LG\_D &= EOTF[\max(0, G')] = PQ[\max(0, G')] \\ LB\_D &= EOTF[\max(0, B')] = PQ[\max(0, B')] \end{aligned} \quad \text{[Eqs. 1]}$$

In this equation LR_D is the (linear) amount of red contribution to be displayed, to create a particular pixel color having a particular luminance (in (partial) nits), and R' is the non-linear luma code value, e.g. 419 out of 1023 values in a 10 bit coding.

The same will happen for the blue and green component. If one e.g. needs to make a particular achromatic color of 1 nit (total luminance of that color to the eye), one needs e.g. 1 units of blue, and the same for red and green. If one needs to make 100 nits of that same color, one can then say that LR_D=100 nits (the visual weight for that red is taken outside the equations).

If one now controls this display driving model via the luma offset knob, the general equations become:

$$LR\_D\_c = EOTF[\max(0, a*R' + b)], \quad \text{with } a = 1 - b/\text{inv\_EOTF}[PL\_D], \text{ etc.} \quad \text{[Eqs. 2]}$$

inv_EOTF[ ] is the mathematical inverse equation of EOTF[ ].

Instead of displaying the zero black of the image somewhere hidden in the invisible display blacks, with this approach one raises it to just the level where the blacks happen to become sufficiently discriminable (note that for consumer displays other mechanisms than the PLUGE may be used, e.g. viewer preference, potentially leading to another possibly sub-optimal though viewer-preferred and usable value of luma offset b).

This is a post-processing step of the display, after the creation of the optimally re-graded image. I.e. first the optimally theoretically re-graded image is calculated by the decoder, e.g. first mapping to a reconstructed master HDR image, and then luminance re-mapping to e.g. a 550 nit PL_V MDR image, i.e. taking into account the brightness capability PL_D of the display.

And after this optimal image has been determined according to the ideal vision of the movie creator, it is further mapped by a display taking into account expected visibility of the blacks in the image.

According to the inventor a problem is that this is rather a crude operation on a grading that might have been carefully crafted, ergo there may be an opportunity to invent a better alternative, which gives better looking images.

US2019/0304379 is another technical approach to create display-optimized luminance re-gradings which also take into account amount of ambient light.

The system is based on determining an appropriate amount of average backlight setting (upon which one could still vary with local dimming) combined with the native achievable dynamic range of the LCD display panel (e.g. closed pixels still transmitting an amount of dark leak light being $1/1000^{th}$ of the open pixel light).

The display mapping a based on designing an optimal S-curve, which is defined by one or more—typically 3-metadata values which describe the input image, and therewith an optimal S-curve can be determined by the receivers of the image. This S-curve approach was found well-working when making LDR prints in the wet photography era from larger dynamic range negative capturings, and would also work nicely in the digital age.

E.g., the metadatum specifying the average luminance (or luma, in case the method is applied in a luma domain), called midpoint luminance value, can determine the shape and position of the linear slope of the S-curve. The reader can understand that if the input image is a rather dark image, e.g. nighttime with badly lit buildings, those low luminances on the HDR input range can be mapped to the middle of the output range (e.g. 20-60 nit for LDR), making them nicely visible on the lower dynamic range display. Similarly a maximum luminance metadatum of the input image can help determine where the S-curve has to start leveling off at the upper end. If the maximum is much higher than the average, which must ultimately be displayed up to 60 nit, given only 40 nits remain available for the highlights, one should start the soft-clipping upper part of the S-curve early on the input range of luminances (which will work especially well if there are not too many very bright pixels, e.g. a few shiny patches reflecting the scene lighting on metal objects).

A similar kind of tapering is done on the lower available range, i.e. the output luminances below 20 nit, by determining the lower-end gradual clipping of the luminance mapping S-curve (sometimes called foot or toe of the S-curve).

So this method of display adaptation (or display management as it is called in US'379) works well on all kinds of input images, however, the assumption is that the image is being down-graded for a lesser dynamic range display in the same viewing environment as the input image was made in (e.g. graded on a 4000 nit grading display, in a typical ambient/surround light level of a grading booth, i.e. darkened, with controlled low illumination).

The idea to generalize for any viewing surround, is to design a strategy which bases itself on changing the master graded input HDR image as it should have been graded, would the grading booth have been lit in a different manner, e.g. with the amount of light in a train during daytime. This redefinition of the master graded image is called the virtual image.

This is again just an image, so one can again use exactly the same display adaptation.

That master/input image would be brightened for a brighter surround (all the luminances would be higher, from the darkest to the maximal one), ergo, also after the standard S-curve display management it would look too bright on the end display of lesser dynamic range, if the surround light level was still the reference dimmed light level. But both would look good under the new light level. One must not forget to calculate new metadata (minimum, midpoint, maximum) for the re-defined brightened (virtual) input image of the approach.

This approach is technically not like a system which uses a single control value, which allows positioning along a metric, which one can lie along the various points of a metadata-specifiable reference luminance mapping function of largely any shape as desired, so that one can find points of a new (adjusted) curve at those points of the metric, and certainly not a control value which is based on a maximum luminance whilst re-defining it with a black value.

Document 6/115-E of 27 Mar. 2017 of ITU Radiocommunication study groups, revision of Working Party 6C of report BT.2390-1 called High Dynamic range television for production and international program exchange (question ITU-R 142-2/6), teaches the following.

An image for a reference viewing environment displayed on a reference display is made by varying upon a reference OOTF with artistic adjustments (creative intent). The image can on a receiving side be display adjusted for a non-reference display in a non-reference viewing environment. The reference OOTF optimizes the direct camera capturing, which camera capturing is just a relative luminance measurement of a scene, but not optimal as a good image look for typical display. This approach can be applied in a preceptual quantizer HDR coding system, i.e. the artistically optimized pixel luminances can be encoded as PQ lumas prior to HDR image (/video) communication.

In addition to the OOTF on the camera side, which does a rough average grading of the camera image, an EETF is defined to be applied (as luma to luma mapping to calculate a luminance mapping) to adapt the high dynamic range created images for lesser dynamic range displays. Since the codeable PQ range allows for coding images with pixel luminances as dark as $1/10000$ nit and potentially as bright as 10,000 nit, and a typical HDR display would currently display between 0.01 and 1000 nit, a fixed re-mapping curve is presented. However, whereas 0.01 nit may characterize the black of such a display (e.g. purchasable consumer television), under various ambient light level and front of screen reflection the minimum achievable black may be e.g. 0.1 nit. So the same S-curve can be calculated for the scenarios of starting at various minimum black levels. Mapping a particular curve to an available display range is technically very different from changing a control parameter in a metric-based function shape following display adaptation algorithm.

SUMMARY OF THE INVENTION

A visually better looking image for various surround illumination levels can be obtained if one calculates it with a method of processing an input image to obtain an output image, wherein the input image has pixels which have input luminances which fall within a first luminance dynamic range (DR_1), which first luminance dynamic range has a first maximum luminance (PL_V_HDR),

- wherein a reference luminance mapping function (F_L) is received as metadata associated with the input image,
- wherein the reference luminance mapping function specifies a relationship between luminances of a first reference image and luminances of a second reference image,
- wherein the first reference image has a first reference maximum luminance and the second reference image has a second reference maximum luminance,
- wherein the input image is equal to one of the first reference image and the second reference image,
- wherein the output image is not equal to the first reference image nor the second reference image;
- wherein the processing comprises applying an adapted luminance mapping function (FL_DA) to the input pixel luminances, to obtain the output luminances,
- wherein the adapted luminance mapping function (FL_DA) is calculated based on the reference luminance mapping function (F_L) and as a control parameter which specifies how much the adapted luminance mapping function deviates from the reference luminance function a maximum luminance value (PLA),
- wherein the calculation of the adapted luminance function involves finding a position on a metric which corresponds to the maximum luminance value (PLA),
- wherein a first endpoint of the metric corresponds to the first maximum luminance (PL_V_HDR) and a second endpoint of the metric corresponds to a maximum luminance of one of the first reference image and the second reference image not being equal to the input image,
- characterized in that maximum luminance value (PLA) is calculated based on a maximum luminance (PL_D) of a display which is to be supplied with the output image, and a black level value (b) of the display,
- wherein the calculation comprises applying an inverse of an electro-optical transfer function to the maximum luminance (PL_D), subtracting from the resulting value the black level value (b), and applying the electro-optical transfer function to the subtraction to obtain the maximum luminance value (PLA), to be used in the calculation of the adapted luminance function.

A main characterizer of the dynamic range of pixel luminances is the maximum luminance. I.e., all pixels of an image created (encoded) according to such a dynamic range must necessarily not be brighter than this maximum luminance. Note that an often used agreement is that luminances of components are for simplicity visual-weight-prescaled, so that 1 nit red, green and blue, give an achromatic 1 nit grey pixel color (then the same OETF or EOTF equation can be used). In case the image is of a set of images (a.k.a. a video), then not all images necessarily need to contain a pixel having a pixel luminance equal to the maximum luminance, but this set of images is defined by this maximum nonetheless.

In the prior art display adaptation, the maximum luminance (PL_V) would be the one taken from the display which is connected or to be connect (PL_D), e.g. a 500 nit display. The content per se would then be optimized for a typically lower maximum displayable luminance of the display, compared to what is present of bright pixel luminances in the input image. This approach has found good applicability, and allows the video creator to have a good control over how his created images (typically a master image, of best quality, good for all displays, though specified as optimal for a particular associated target display, for which the image was specifically color graded) should in the end look on any available endpoint (e.g. consumer viewer) display.

In general, we will still want to use a PL_V control value which is related to the end display on which the images will be viewer, but we can re-define the concept.

Now some adjusted value of the maximum luminance is determined, which specifically takes into account a black level of the display (i.e. visible on the display). This will give a different level of control over the re-grading for displays of different, typically lesser, dynamic range than the target display of the received image, which as the inventor found works well for viewing surround brightness adaptative re-grading.

Any HDR electro-optical transfer function can be elected for the method (it would typically be pre-fixed by the designer of the technology). An electro-optical transfer function (EOTF) is a function which defines to be displayed pixel luminances corresponding to their so-called luma codes. These luma codes are e.g. 8, 10, or 12 bit words, each word (luma level) specifying a particular luminance.

Though not a limiting factor of the present innovations, a well-working EOTF is the known Perceptual Quantizer, which is defined in the SMPTE ST.2084 standard. This works psychovisually well, as would other largely perceptually uniform HDR EOTFs.

The black level can be determined as said with a standardized test pattern with dark black test patches, such as the PLUGE, but is in general any value b that can be elected and represents exactly or approximately the darkest black that can still be discerned on a display given any viewing room constraints (e.g. a lamp which is turned on in the vicinity). i.e. it is a black color which looks slightly lighter than the full black, which drowns all darker pixels. It will be represented without limiting intent in the elucidating teachings of the present patent application in the domain of Perceptual Quantizer lumas (which the skilled person understands is the set of lumas on which one can represent corresponding luminances, which can also be represented in the domain of luminances per se, and we will switch between the domains where this is technically advantageous).

The reference images may typically be different from both the input and output image, but we will assume that the input image is (identical to) one of the reference images, e.g. the HDR image of the HDR/SDR pair of reference images. The output image will not be identical to one of the reference images, and typically being a medium dynamic range image for some particular display for which the received image(s) is optimized, with an in-between maximum luminance, e.g. 900 nit, lower than the e.g. 2000 nit of the received HDR image.

So the method (or apparatus) will typically be:

a method of processing an input image to obtain an output image,

- wherein the input image has pixels which have input luminances which fall within a first luminance dynamic range (DR_1), which first luminance dynamic range has a first maximum luminance (PL_V_HDR), wherein a reference luminance mapping function (F_L) is received as metadata associated with the input image, wherein the reference luminance mapping function specifies how luminances of the input image should map to luminances of a second image which has a different dynamic range than the input image, wherein the second image has a reference maximum luminance, wherein the output image is not equal to the input image nor the reference image, and has an output maximum luminance which is different from the first maximum luminance and the reference maximum luminance, e.g. in between these values, or below the lower one of the two or above the higher one;

wherein the processing comprises applying an adapted luminance mapping function (FL_DA) to the input pixel luminances, to obtain the output luminances, wherein the adapted luminance mapping function (FL_DA) is calculated based on the reference luminance mapping function (F_L) and as a control parameter which specifies how much the adapted luminance mapping function deviates from the reference luminance function a control maximum luminance value (PLA), wherein the calculation of the adapted luminance function involves finding a position on a metric which corresponds to the maximum luminance value (PLA), wherein a first endpoint of the metric corresponds to the first maximum luminance (PL_V_HDR) and a second endpoint of the metric corresponds to the reference maximum luminance, characterized in that maximum luminance value (PLA) is calculated based on a maximum luminance (PL_D) of a display which is to be supplied with the output image, and a black level value (b) of the display, wherein the calculation comprises applying an inverse of an electro-optical transfer function to the maximum luminance (PL_D), subtracting from the resulting value the black level value (b), and applying the electro-optical transfer function to the subtraction to obtain the maximum luminance value (PLA) to be used in the calculation of the adapted luminance function.

The control maximum luminance should not be confused with the output maximum luminance of the output image: the control maximum luminance functions to have the optimal re-grading behavior, including taking into account the black level, whereas the output maximum luminance is typically the maximum pixel luminance that will occur in the generated output image (or in a video of time-successive image typically the maximum luminance of at least one or some of the pixels in at least one of the video images). The PLA determines the position of the metric, between the diagonal representing the input luminances and the locus of the curve of the reference function, and all positions on the placed metrics then define the adjusted function, needed for obtaining the output luminances.

Often the input image will be a high dynamic range image (e.g. the master image color-graded according to best foreseeable dynamic range quality, e.g. a 5000 nit PL_V image). Often the reference image for which the reference luminance mapping function is defined will be an LDR image, i.e. typically an image with PL_V_LDR=100 nit (but other variants are possible, e.g. the input image being an LDR image, or an intermediate dynamic range image, etc.). A target display may have any capability ranging from legacy LDR displays (approximately 100 nit, i.e. a PL_D which can for all practical purposes be approximated/assumed to be 100 nit), over low-end HDR displays like a 700 nit display, up to good quality HDR displays of 1000 nit or more PL_D, up to even high end HDR displays, above e.g. 3000 nit, and up to above 5000 nit. Viewing conditions can range from very dark living rooms (e.g. no lights on but the tv), over faintly lit, to daytime indoors, to outside.

Where it says "image having luminances", the reader is to understand that the pixel luminances will be typically encoded as (e.g. 10 bit) lumas, but, those can be uniquely converted to corresponding luminances, via an absolute luminance-defining EOTF (which the receiver will know, e.g. by pre-agreement in a single-EOTF coding system, or notifiable via metadata when variable). Similarly, luminance processing may actually be performed as luma processing in a luma domain, but in the end it is luminance processing, at least as the end display will display specific luminances, e.g. up to 750 nit maximum display capability.

The single-control-parameter approach of our re-grading formalism should not be confused with methods which e.g. merely do a transformation based on a minimum black (i.e. not specifically via a redefined maximum luminance).

Important is that we do not just re-use the display adaptation approach (algorithm), but also try to largely follow the shape of the reference luminance mapping function, which may have been carefully designed by the video creator, indicating the particular luminance re-grading needs of the various object luminances of any particular HDR scene image.

Note that we can use this approach for any non-decreasing shape of reference luminance mapping function, rather than having to rely on fixed display adaptation strategies. Our display adaptation approach is also characterized in that it is automatically good for any display, in its mathematics taking optimally into account the dynamic range of the output display up to its PL_D.

The same mathematics of display adaptation can be used as in existing display adaptation to optimize for a lower display maximum luminance, but in the present approach the maximum luminance used in this display adaptation, i.e. which determines the position on the metric where the points of the display adapted luminance mapping function (FL_DA) will fall, is quite differently defined than always being the maximum luminance PL_D of the display to be supplied with display optimized images of the input images.

Preferably, after the display adaptation is performed with the adjusted maximum luminance PLA not equal to PL_D, the black level value (b) is then added to the output luminances as obtained by the display adaptation, preferably with these output luminances represented as lumas in a luma domain of the Perceptual Quantizer.

Advantageously the invention can be embodied as a color transformation circuit (600) comprising:

an input connector (601) to receive an input image;

an output connector (699) to output an output image which is calculated by the color transformation circuit on the basis of the input image, wherein the input image has pixels which have input luminances which fall within a first luminance dynamic range (DR_1), which first luminance dynamic range has a first maximum luminance (PL_V_HDR);

a metadata input (602) to receive a reference luminance mapping function (F_L) which is metadata associated with the input image, wherein the reference luminance mapping function specifies a relationship between luminances of a first reference image and luminances of a second reference image, wherein the first reference image has a first reference maximum luminance and the second reference image has a second reference maximum luminance, wherein the input image is equal to one of the first reference image and the second reference image, wherein the output image is not equal to the first reference image nor the second reference image;

wherein color transformation circuit (600) comprises a luminance mapping circuit (310) arranged to apply an adapted luminance mapping function (FL_DA) to the input pixel luminances, to obtain the output luminances;

wherein the color transformation circuit (600) comprises a luminance mapping function calculation circuit (611) which is arranged to calculate the adapted luminance mapping function (FL_DA) based on the reference luminance mapping function (F_L) and as a control parameter which specifies how much the adapted luminance mapping function deviates from the reference luminance function a maximum luminance value (PLA), wherein the calculation involves finding a position on a metric which corresponds to the maximum luminance value (PLA), wherein a first endpoint of the metric corresponds to the first maximum luminance (PL_V_HDR) and a second endpoint of the metric corresponds to a maximum luminance of one of the first reference image and the second reference image not being equal to the input image, characterized in that the luminance mapping function calculation circuit (611) is arranged to receive a maximum luminance (PL_D) of a display which is to be supplied with the output image, and a black level value (b) of the display, and wherein the luminance mapping function calculation circuit (611) is arranged to calculate the maximum luminance value (PLA) by applying an inverse of an electro-optical transfer function to the maximum luminance (PL_D), subtracting from the resulting value the black level value (b), and applying the electro-optical transfer function to the subtraction to obtain the maximum luminance value (PLA).

Advantageously the color transformation circuit (600) has a luminance mapping function calculation circuit (611) which applies as the electro-optical transfer function the Perceptual Quantizer function.

Advantageously the color transformation circuit (600) comprises a display mapping circuit (320) arranged to add in a luma domain of the Perceptual Quantizer the black level value (b) to luma values of the output luminances represented in said luma domain of the Perceptual Quantizer.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concepts, and in which dashes are used to indicate that a component is optional, non-dashed components not necessarily being essential. Dashes can also be used for indicating that elements, which are explained to be essential, but hidden in the interior of an object, or for intangible things such as e.g. selections of objects/regions.

In the drawings:

FIG. 4 which consists of sub-images FIG. 4*a* and FIG. 4*b*, shows two possible variants of display adaptation, to obtain from a reference luminance mapping function F_L, which codifies the luminance re-grading needs between two reference images, a final display adapted luminance mapping function FL_DA, to be used to calculate the optimal display-adapted version of an input image, for a particular display capability (PL_D);

FIG. 8*a* shows an exemplary image, with some darker pixel regions like the tires under the police car and the interiors of the house seen through the windows, like the circular attic window, and some mid-range average brightness pixel regions, like the body of the police car and the person, and some bright HDR pixel regions, like the flashing lights on top of the police car; FIG. 8*b* shows these objects and their average luminance spread around an exemplary HDR image luminance range, and an MDR image luminance range with twice the same maximum luminance (the maximum luminance of the output image ML_V_out) but obtained by luminance mapping according to two different methods; FIG. 8*c* shows the same effect of the two methods with luminance histogram.

DETAILED DESCRIPTION OF THE EMBODIMENTS

Figure 6:
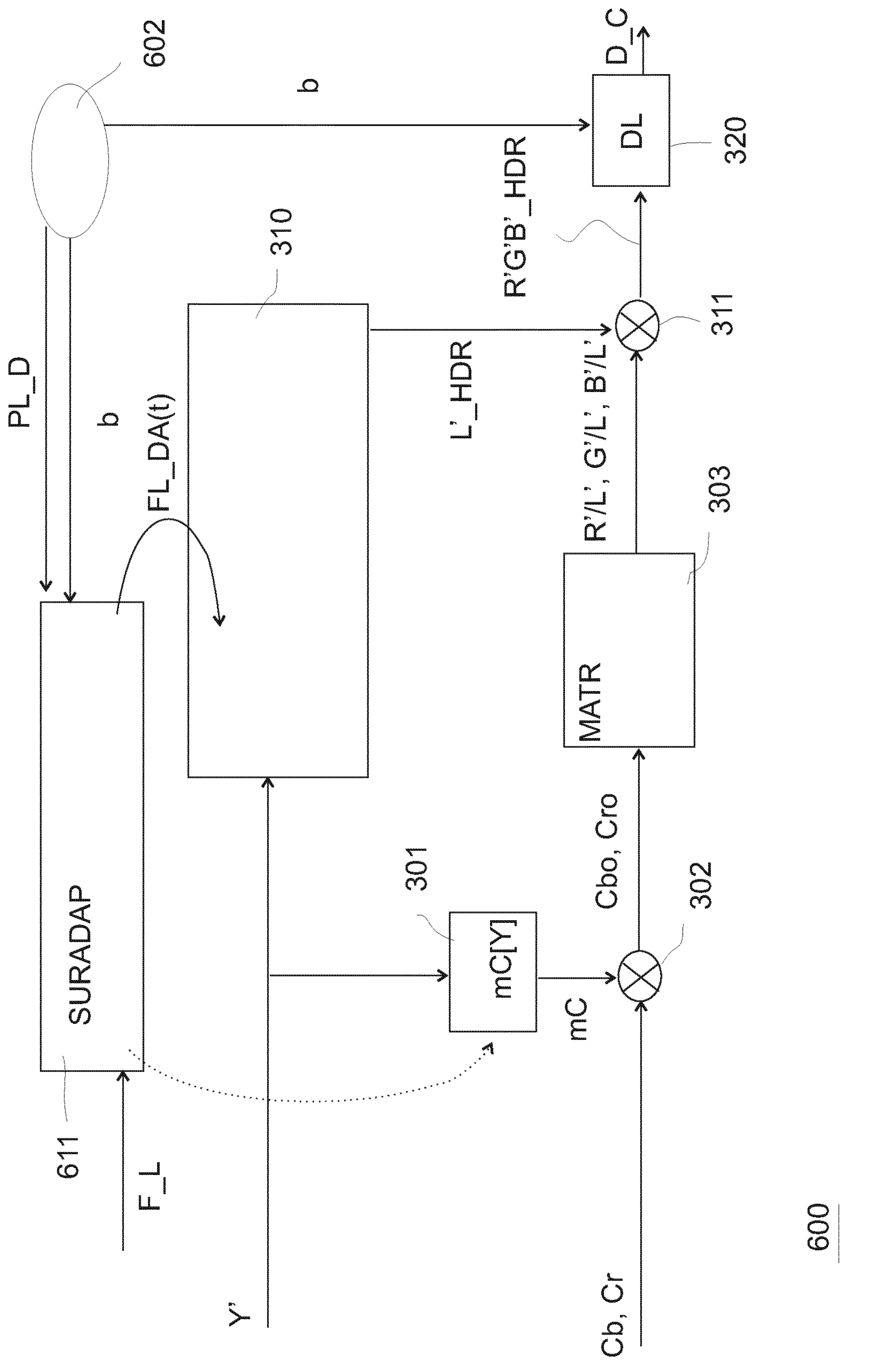
FIG. 6 shows a receiver (in particular a color processing circuit) according to an embodiment of the present invention.

FIG. 6 shows the surround-light-level-adaptive processing embodied in a color transformation circuit 600. Such a circuit may typically reside in a HDR video decoder of a television signal receiver (e.g. broadcast, delivery of video over internet, etc.). Physically it may reside in a television display, a mobile phone, a receiving apparatus (e.g. a settopbox), etc. The image pixel colors come in one-by-one, and we assume that they are luma Y' and chroma Cb,Cr-encoded, in the PQ domain (i.e. the luma has been calculated from non-linear red, green and blue color components by applying the Perceptual Quantizer inverse EOTF, and the chromas are calculated as per the usual colorimetric definition of video color).

Figure 1:
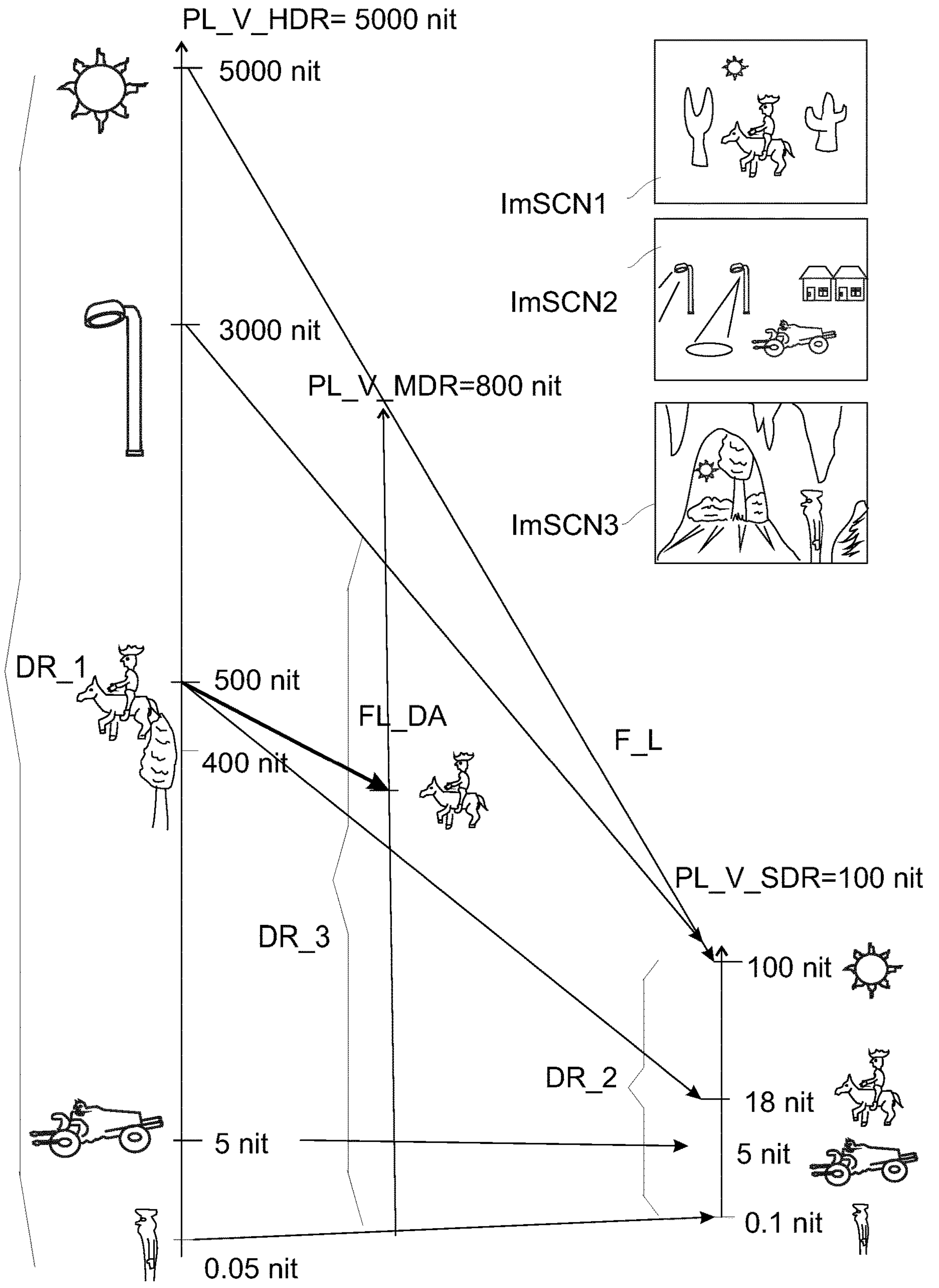
FIG. 1 schematically illustrates a number of typical color transformations which occur when one optimally maps a high dynamic range image to a corresponding optimally color graded and similarly looking (as similar as desired and feasible given the differences in the first and second dynamic ranges DR_1 resp. DR_2) lower dynamic range image, e.g. a standard dynamic range image of 100 nit maximum luminance, which in case of invertibility would also correspond to a mapping of an SDR image as received which actually encodes the HDR scene, to a reconstructed HDR image of that scene. The luminances are shown as locations on vertical axis from the darkest black to the maximum luminance PL_V. A luminance mapping function is symbolically shown by arrows which map average object luminances from their luminances on the first dynamic range to the second dynamic range (the skilled person knows how to equivalently draw this as a classical function, e.g. on normalized-to-1 axis, which are normalized by dividing by the respective maximum luminances)
Figure 2:
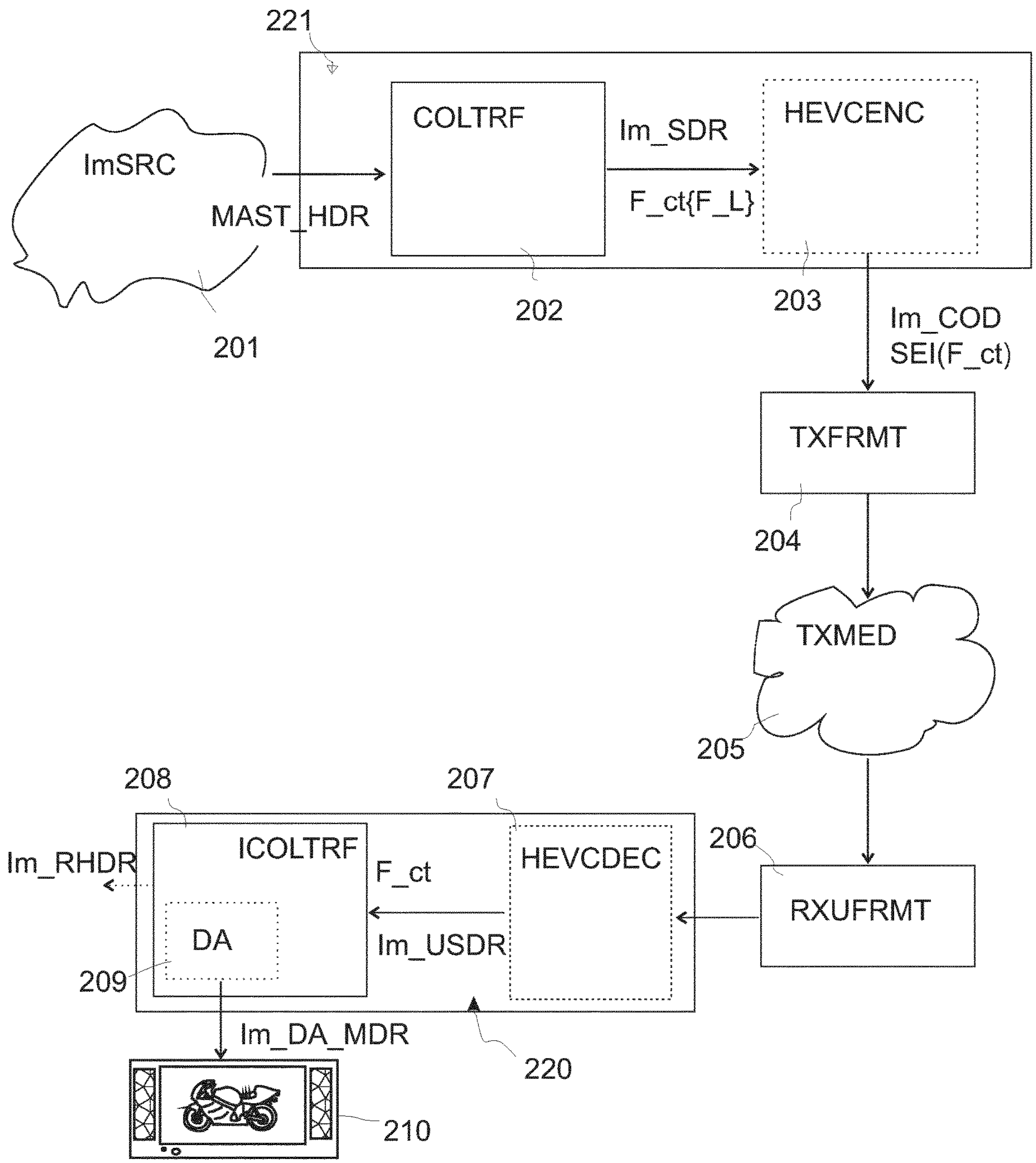
FIG. 2 schematically illustrates an high-level-view example of a technology to encode high dynamic range images, i.e. images capable of having luminances of at least 600 nit typically or more (typically 1000 nit or more), which applicant recently developed, which can actually communicate the HDR image either per se or as a corresponding luminance-regraded SDR image plus metadata encoding color transformation functions comprising at least an appropriate determined luminance mapping function (F_L) for the pixel colors, to be used by the decoder to convert the received SDR image(s) into HDR images(s)
Figure 3:
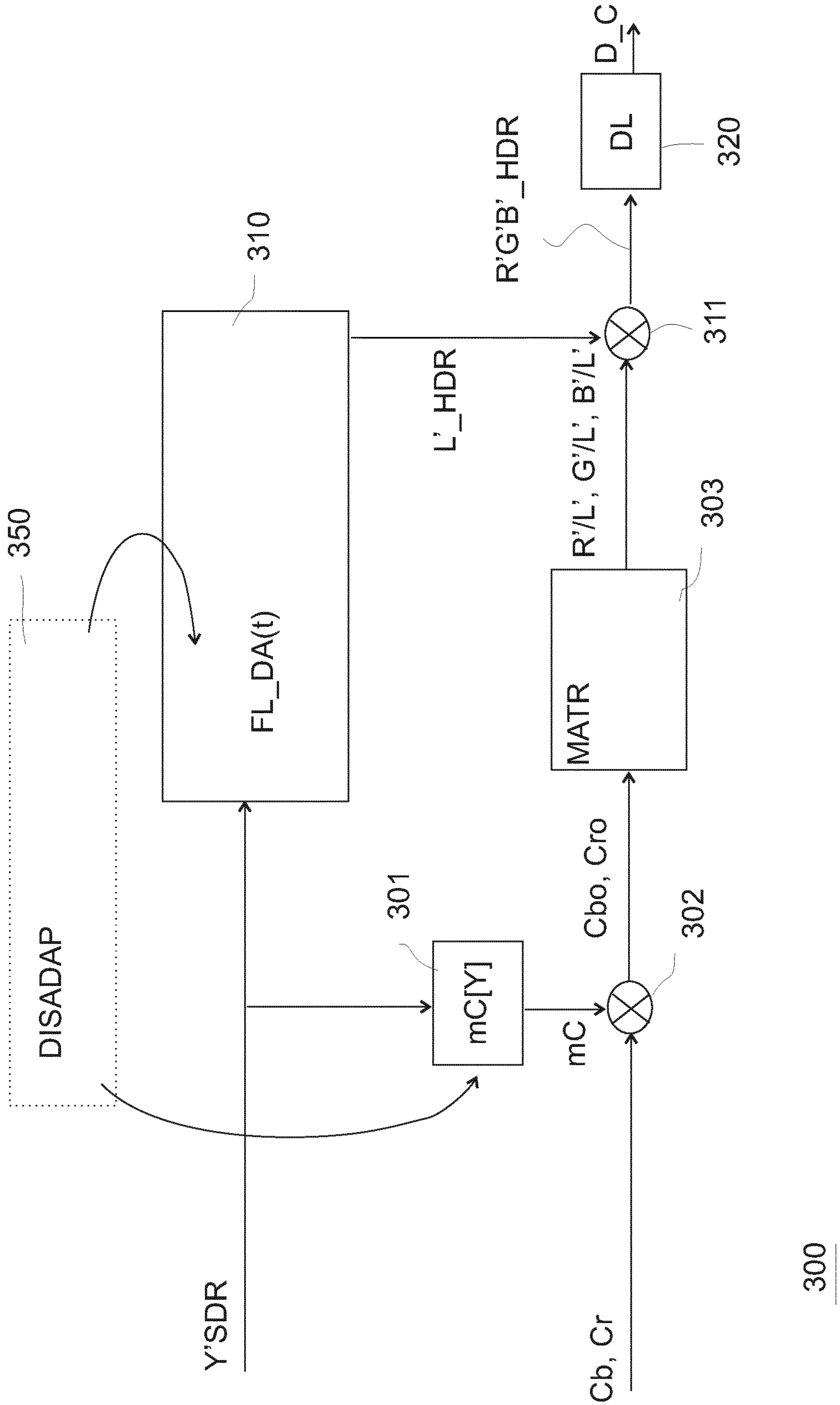
FIG. 3 shows details of the interior of the image decoder, in particular the pixel color processing engine, as a (non-limiting) preferred embodiment.

The luma component Y' (let's assume it is the luma of a HDR image, as on the leftmost axis of FIG. 1) is processed by luminance mapping circuit (310).

It gets as metadata input a reference luminance mapping function F_L. This would be the function to apply, if one needed to produce the secondary reference image, and, if there was no correction for the surround light level, i.e. for the minimum discernable black on the display.

The purpose of luminance mapping function calculation circuit (611) is to determine the appropriate display- and surround-adaptive mapping function (FL_DA(t), in which the time t indicates that this may typically change over time, not because the display or the viewing environment would change, but because the content of the video images would change, luminance-distribution-wise, which would typically require different luminance re-grading functions for the successive images).

This function FL_DA(t), when specified in the correct domain (e.g. as an equivalent function on PQ lumas) can then directly be applied by luminance mapping circuit (310) to the input lumas Y' to yield the needed output lumas or luminances L'_HDR. I.e. it is communicated from luminance mapping function calculation circuit (611) to luminance mapping circuit (310) and stored in the latter in memory, typically to the start of a new image to be color-processed, before which a new function will be stored.

To perform its calculations, the luminance mapping function calculation circuit (611) needs the following data: the reference luminance mapping function F_L, the maximum luminance of the connected display (PL_D), and the black level value (b), which may be communicated as a PQ luma code value, or a luminance in nit which can be converted to a PQ luma. The latter two come from a metadata memory 602, e.g. directly from a connected display. The rest of the color processing is, in this already explained merely elucidating embodiment, as explained above (e.g. there may be a different color processing track, as the present innovation is primarily concerned with the luminance part).

Figure 5:
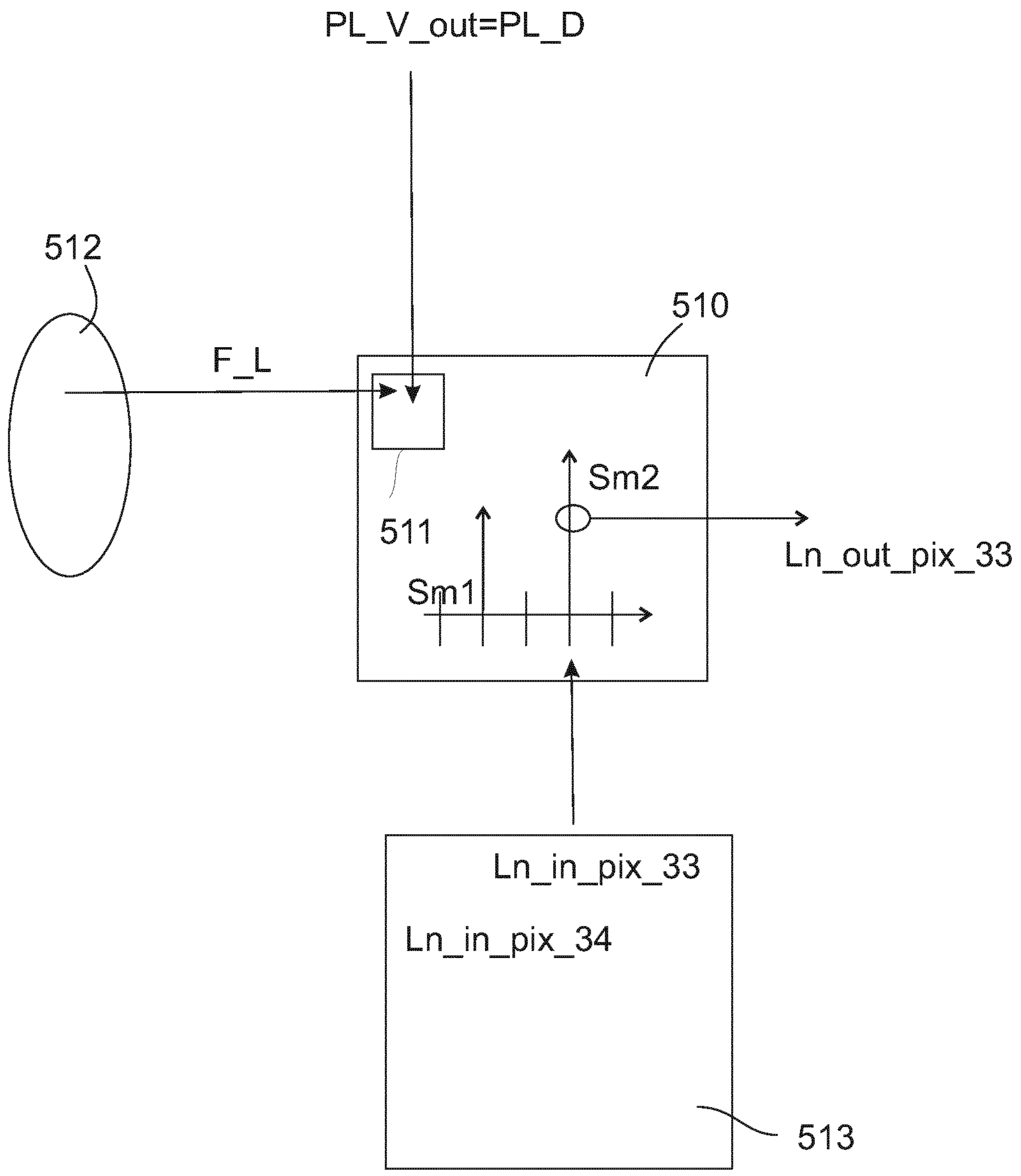
FIG. 5 summarizes the principles of display adaptation more generically, to more readily understand it as a component in the formulation of the present embodiments and claims.

Before the luminance mapping function calculation circuit (611) will perform its configured display mapping algorithm to derive the FL_DA function on the basis of the F_L function, it must calculate the new (adjusted) maximum luminance value (PLA). To be clear, this is not the actual maximum value of the display (i.e. PL_D), but merely a value which functions as if it was the PL_D value, in the otherwise unvaried display adaptation algorithm (as explained with FIGS. 4 and 5).

The luminance mapping function calculation circuit (611) calculates:

$$PLA = EOTF(\text{inverse\_EOTF(PL\_D)} - b) \quad \text{[Eq. 3]}$$

As said, preferably the applied EOTF is the Perceptual Quantizer EOTF (EOTF_PQ), although other EOTFs may work as well, in particular if they are reasonably uniform psychovisually, i.e. a step of k luma codes approximately shows as a certain visual difference, irrespective to with starting luma level 1 this step is applied.

Thereafter, in a preferred embodiment, a further processing is performed, namely a re-positioning to the black level value b. To achieve this, also the display mapping circuit 320 receives the display black level value b, i.e. for this viewing surround situation. The display mapping circuit 320 can have several processing functions, as it generally prepares its pixel colors output signal (i.e. display driving colors D_C) to be as desired for a particular display. A useful manner of realization is to work in the PQ domain, i.e. the display wants to get e.g. R'G'B' values of the PQ-type (or Y'CbCr values derivable therefrom to and fro). So internally this component can also work in the PQ domain. The R'G'B'_HDR values may be in another domain (e.g. they could be linear), in which situation the display mapping circuit 320 can internally do a conversion to PQ (which as said is done in a standardized manner as specified by the SMPTE).

It will perform an addition to the three PQ-domain color components:

$$R'\_\text{out} = a * R' + b; \quad \text{[Eqs. 4]}$$

$$G'\_\text{out} = a * G' + b;$$

$$B'\_\text{out} = a * B' + b;$$

The constant a may again be a scaling factor, to put signal white on displayable white, but one could also use other approaches, e.g. clipping or some non-linear equation (note that since Y' is by standard agreed definition a linear combination of the R'G'B' color components with three weights which sum to 1, one also has Y'_out=Y'+b).

These output signals will then constitute the D_C output, e.g.:

$$\text{D\_C} = \{R'\_\text{out}, G'\_\text{out}, B'\_\text{out}\}.$$

This approach of adding b has the additional advantage that the darkest colors start at the visibility threshold, but the method is also useful if one only applies Eq. 3, i.e. only the different white setting adjustment, since this already improves inter alia the contrast of the image.

Figure 7:
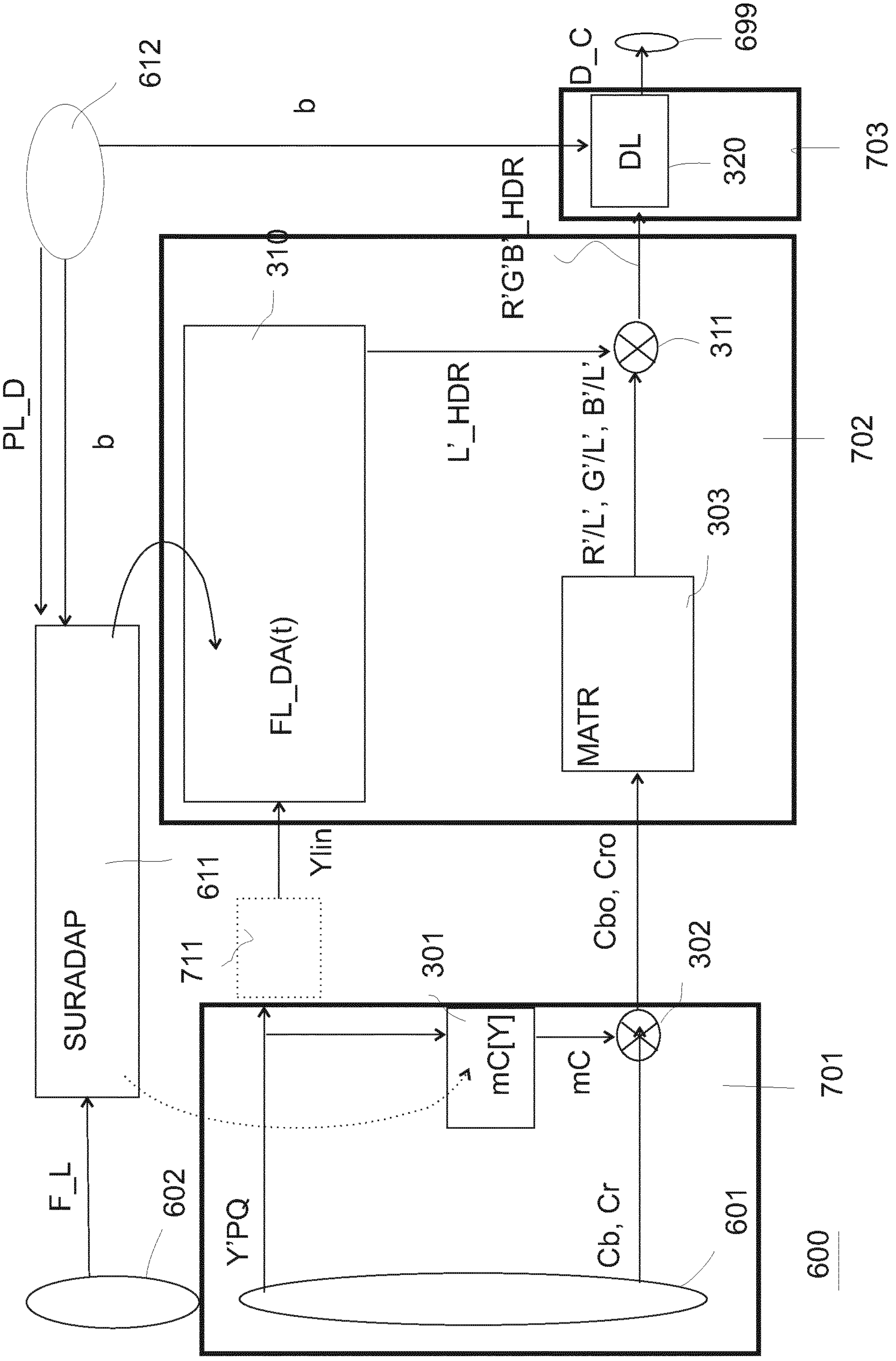
FIG. 7 elucidates a further embodiment, in particular to elucidate the distribution of processing between a linear domain (which can be further mapped to a psychovisually uniform domain inside the linear processing if so desired as that may be advantageous), and the Perceptual Quantizer domain, and in particular to elucidate and advantageous manner of adding the display black level b.

FIG. 7 is still useful to elucidate the different color domains in the processing.

If, as typical, the colors come in represented in the PQ domain, the first part of the processing is in the PQ domain (n.b. the chromatic processing, i.e. not of the luminance but the proper color types, e.g. saturated yellow, is an independently configurable processing path, but it may also happen in the PQ domain). In this FIG. 7 we have now explicitly included a color space conversion circuit 711. It will convert the PQ lumas to linear luminances Ylin. This could also be immediately performed in the function of the luminance mapping circuit 310, as this may typically internally do other color space conversion anyway (applicant has found it useful to specify its re-grading function definitions in a display-optimal psychovisually uniformized color space, and so will all other processing follow), but that aspect is not essential for the present innovation, ergo we will not confuse by diving further into this. We assume the processing starts out in PQ, in sub-circuit (or processing part) 701, then end-to-end is linear between Ylin and L'_HDR respectively R'G'B' HDR in sub-circuit 702, and then is reconverted to the PQ domain in subcircuit 703, respectively display mapping circuit 320. This is where both the needed output format is generated, and, according to this innovation the additive correction for the black level can take place, in the PQ domain (the skilled person understands that one can apply the principles in other domains than this preferred elucidation embodiment).

Finally, there is an output connector 699 for communicating the optimized images and their pixel colors. Just like image input connector 601, this may physically range over the various available technologies for communicating images, e.g. a HDMI cable, a connection to a wireless channel antenna, etc. Metadata input may be a separate input, but advantageously this metadata will be co-communicated with the image color data, i.e. e.g. SEI messages interspersed with MPEG video over an internet connection, or separate data packages over a HDMI cable, etc.

Figures 8, 8A, 8B, 8C:
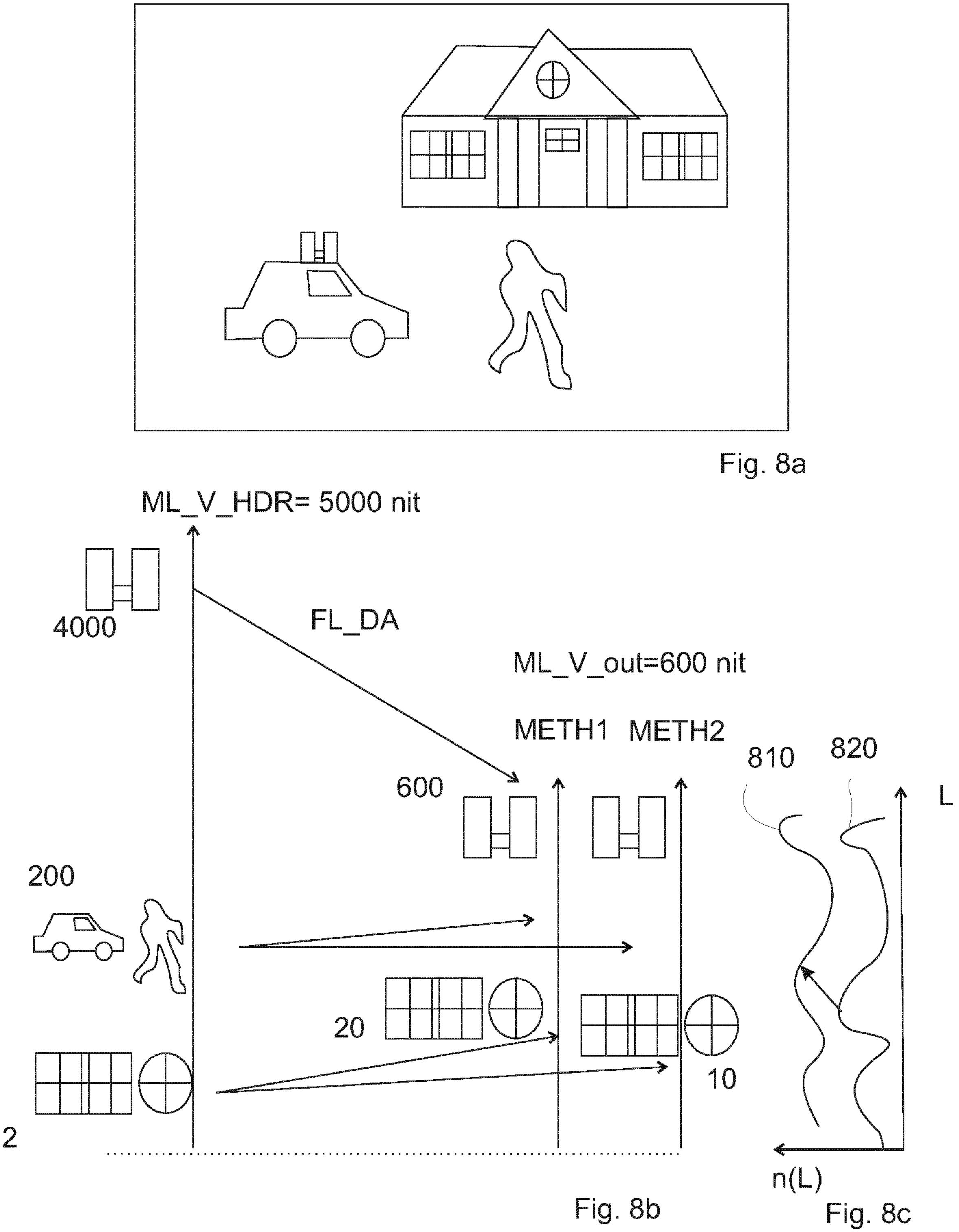
FIG. 8, which consists of sub
-FIGS. 8*a*, 8*b* and 8*c*, shows some resulting effects of applying the present processing.

FIG. 8 elucidates how the present method of luminance mapping works, and its advantages over the existing method.

On the leftmost luminance axis of FIG. 8*b*, we see the average luminance of the various image objects when represented in a 5000 nit HDR image, the geometrical structure of which is shown in FIG. 8*a*. This may be the master grading image, i.e. the best quality image of the scene, which can typically double as first reference image, and we can assume it to be the input image (which is e.g. communicated by the broadcaster, and received in a television display which performs the color transformation, in the example to a 600 nit MDR image, optimized for a 600 nit PL_D display to which the output images are output).

The image (or video/movie) creator may decide to make the flashlights of the police car very bright, e.g. 4000 nit. He may make the unlit interior parts seen through the windows of the house (e.g. in a night scene) quite dim, as they are only lit by some exterior street lights. When creating the master image, it is made for the best viewing circumstances, e.g. in a dim living room of a consumer, where there is only a small lamp. As the viewer may under such circumstances see many different dark colors, the master image should ideally have information for all of these indoors pixels, so the indoors object structure is encoded in the master image around an average of e.g. 2 nit (maybe all the way down to 0.01 nit). The problem is now that the neighbor will watch the same movie, i.e. the same communicated 5000 master HDR image comprising the same dark pixels, in a very well lit room, maybe during the daytime. He may not be able to see the darkest pixels, but maybe nothing dimmer than 7 nit.

The right side of FIG. 8*b* shows how one can adapt the received reference image to a MDR image, which not only has a lower maximum luminance, but more importantly in this teaching (even if it had the same 5000 nit maximum), a higher black level value b, e.g. being 7 nit.

Method METH1 is the method described above with Eqs. 2, and is how the skilled person may typically solve the problem, i.e. he will see that there are some dark pixels which are invisible, ergo squeezes everything in the visible range above black level b.

How this works is shown with the 20 nit windows, and also the first histogram 810 of FIG. 8*c*. The shift to 20 nit may be somewhat large, leading to a sub-optimal visual contrast of the resultant MDR image. Furthermore, this corrective method spreads the dark level offset correction quite far, in fact over the entire range, so also the middle luminances of e.g. the person are shifted to brighter values significantly (which may have a sub-optimal impact on these regions too, i.e. on the total contrast of the image). This can be seen from the shift of the histogram lobe of the dark, and middle-bright objects in the histogram of the old method, versus the second histogram 820, which together with the luminance axis labeled METH2, represents the present new approach.

Not only in general does the image look better, with a more realistic contrast, but by applying this method in the display adaptation process, one can more realistically follow the desiderata of the movie creator, i.e. as represented in particular in the reference re-grading luminance mapping function F_L. E.g., the grader can specify this function so that a sub-range of the darkest luminances, let's say in the example the indoors pixels, gets a considerable boost when mapping to lower maximum luminances, whilst e.g. the local slope of the mapping in the HDR luminance sub-range where the car luminance fall can stay low. The grader can so indicate that, in this story, the interiors of the houses are important (compared to a scenario where they are unimportant and may just as well drown in invisible black), so each time a luminance mapping is done to a progressively lower maximum luminance image, a progressively larger normalized sub-range of the available luminances is used for the darkest indoors pixels, so that they still stay relatively well visible, even on the dimmer displays (and in this case, even on brighter displays, but with less visibility of the darkest pixels). The present approach can follow these technical desiderata, as accurately as feasible. It will not do the re-distribution of the mapping to the ideal available situation, i.e. 0 nit to PL_D nit, but to the actually available luminances b nit to PL_D nit, and still optimally use this range as the content creator intended, as communicated in the F_L function, as good as possible, which usually will be satisfactory to the viewer, which is at least an elegant not too difficult practical method.

A numerical example is given to point to the aspect of the non-linearity of the EOTF_PQ: the lowest lumas, up to quite some high value, correspond to quite dim luminances, so a relatively bright dark level will typically correspond to a relatively high luma value, and therefore lower the PLA value considerably compared to the PL_D value, but that is what the present method still optimally employs. E.g. assume PL_D=1000 nit, and EOTF_PQ(b)=0.3 nit. Then b as a PQ luma will be 0.097*1023=99. Inverse_EOTF(1000) will be 0.75*1023=767. The difference of these two will be 668.

The question is now: to which adjusted white level for controlling the display adaptation does this luma level correspond.

EOTF_PQ(668/1023)=EOTF_PQ(0.65)=408 nit. Ergo, the PLA value for such a display and viewing surround brightness (as quantified as a minimum visibility on the display screen) is 408 nit. This value will be input in whichever embodiment of display adaptation the luminance mapping function calculation circuit (611) uses, and the correct display adapted luminance mapping function FL_DA will result, which is now not only display-optimized, but furthermore also viewing environment-optimized.

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small circuit part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data travelling via a network connection—wired or wireless—, or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. A method of calculating an output image comprising:

receiving a reference luminance mapping function as metadata associated with an input image, wherein the reference luminance mapping function specifies a relationship between luminances of the input image and luminances of a reference image, wherein the input image has an input maximum luminance and the reference image has a reference maximum luminance, wherein the input image has pixels, wherein the pixels have input luminances, wherein the input luminances fall within an input luminance dynamic range, wherein input luminance dynamic range is bounded by the input maximum luminance;

calculating a locus of points so as to form an adapted luminance mapping function, wherein each point on the locus is a point on a metric, wherein the metric has a first endpoint and a second endpoint, wherein the first endpoint is on the reference luminance mapping function, wherein the second endpoint is on a diagonal, wherein the locus of points depends on a control parameter;

calculating the control parameter, wherein the control parameter specifies how much the adapted luminance mapping function deviates from the reference luminance function;

wherein the control parameter is based on a maximum luminance of a display and a black level of the display, wherein the maximum luminance of the display is provided with the output image, wherein the calculating of the control parameter comprises:

applying an inverse of an electro-optical transfer function to the maximum luminance of the display to produce a first result;

subtracting the black level from the first result to produce a second result; and applying the electro-optical transfer function to the second result; and applying the adapted luminance mapping function to at least a portion of the input pixel luminances so as to obtain output luminances for at least a portion of pixels of the output image.

2. The method as claimed in claim 1, wherein the electro-optical transfer function is a Perceptual Quantizer function.

3. The method as claimed in claim 1, wherein the output luminances are represented as output lumas in a luma domain of a Perceptual Quantizer, wherein the black level is added to the output lumas, to obtain adjusted output lumas.

4. A device arranged to calculate an output image comprising:

an input circuit, wherein the input circuit is arranged to receive a reference luminance mapping function as metadata associated with an input image;

wherein the reference luminance mapping function specifies a relationship between luminances of the input image and luminances of a reference image, wherein the input image has an input maximum luminance and the reference image has a reference maximum luminance, wherein the input image has pixels, wherein the pixels have input luminances, wherein the input luminances fall within an input luminance dynamic range, wherein input luminance dynamic range is bounded by the input maximum luminance;

a color calculation circuit, wherein the color calculation circuit comprises a luminance mapping function calculation circuit; and an output circuit, wherein the output circuit is arranged to output the output image, wherein the output image is calculated by the color calculation circuit on the basis of the input image, wherein the luminance mapping function calculation circuit is arranged to calculate a locus of points so as to form an adapted luminance mapping function, wherein each point on the locus is a point on a metric, wherein the metric has a first endpoint and a second endpoint, wherein the first endpoint is on a reference luminance mapping function, wherein the second endpoint is on a diagonal, wherein the locus of points depends on a control parameter, wherein the adapted luminance mapping function is applied to the input pixel luminances so as to obtain output luminances of the output image, wherein luminance mapping function calculation circuit is arranged to receive a maximum luminance of a display and a black level of the display, wherein the color calculation circuit is arranged to calculate the control parameter, wherein the control parameter specifies how much the adapted luminance mapping function deviates from the reference luminance function, wherein the control parameter is defined based on a maximum luminance of a display and a black level of the display, wherein the calculating of the control parameter comprises:

applying an inverse of an electro-optical transfer function to the maximum luminance of the display to produce a first result;

subtracting the black level from the first result to produce a second result; and applying the electro-optical transfer function to the second result.

5. The device as claimed in claim 4, wherein the electro-optical transfer function is a Perceptual Quantizer function.

6. The device claim 4, further comprising a display mapping circuit, wherein the display mapping circuit is arranged to add the black level to lumas of the output luminances, wherein the output luminances are represented as lumas in a luma domain of a Perceptual Quantizer.

7. A computer program stored on a non-transitory medium, wherein the computer program when executed on a processor performs the method as claimed in claim 1.

* * * * *